US011977019B2

(12) United States Patent
Wang et al.

(10) Patent No.: US 11,977,019 B2
(45) Date of Patent: May 7, 2024

(54) IMAGE-BASED MEASUREMENTS OF BIOLOGICAL FORCES IN A DUAL OPTICAL TRAP

(71) Applicant: Cornell University, Ithaca, NY (US)

(72) Inventors: Michelle D. Wang, Ithaca, NY (US); Jessica L. Killian, Ithaca, NY (US); James Inman, Ithaca, NY (US)

(73) Assignee: Cornell University, Ithaca, NY (US)

( * ) Notice: Subject to any disclaimer, the term of this patent is extended or adjusted under 35 U.S.C. 154(b) by 820 days.

(21) Appl. No.: 17/063,457

(22) Filed: Oct. 5, 2020

(65) Prior Publication Data

US 2021/0041346 A1 Feb. 11, 2021

Related U.S. Application Data

(63) Continuation of application No. PCT/US2019/026150, filed on Apr. 5, 2019.
(Continued)

(51) Int. Cl.
*G02B 21/32* (2006.01)
*G01N 15/14* (2006.01)
*G01N 15/1429* (2024.01)

(52) U.S. Cl.
CPC ..... *G01N 15/1463* (2013.01); *G01N 15/1429* (2013.01); *G01N 15/1459* (2013.01); *G02B 21/32* (2013.01)

(58) Field of Classification Search
CPC ...... G02B 21/32; G02B 21/00; G02B 21/361; G02B 21/06; G02B 26/00; G02B 26/08; G01N 15/00; G01N 15/1429; G01N 15/1463; G01N 15/1459; G01N 15/1425; G01N 15/1434; G01N 15/10; G01N 15/1006; G01N 15/0205; G01N 2015/1006; G01N 2015/144; G01N 21/01; G01B 11/00; G01J 4/00; C12M 1/00; G21K 1/006; G21K 1/00; G21K 1/06; B01L 3/502761; B01L 2400/0454; B01L 2200/0668
(Continued)

(56) References Cited

U.S. PATENT DOCUMENTS

2016/0139050 A1 5/2016 Wuite et al.
2018/0024342 A1* 1/2018 Biebricher ........... G02B 27/106
250/459.1

FOREIGN PATENT DOCUMENTS

WO 2012/033409 A1 3/2012

OTHER PUBLICATIONS

Whitley et al (High-Resolution "Fleezers": Dual Trap optical tweezers combined with single molecule fluorescence detection, Methods Mol Biol, Jan. 1, 2018, pp. 1-76) (Year: 2018).*
(Continued)

*Primary Examiner* — Jade R Chwasz
*Assistant Examiner* — Jyotsna V Dabbi
(74) *Attorney, Agent, or Firm* — COZEN O'CONNOR

(57) ABSTRACT

Optical traps enable nanoscale manipulation of individual biomolecules while measuring molecular forces and lengths. Disclosed herein is a camera-based detection system that enables accurate and precise measurements of forces and interactions in a dual optical trap. Optical traps may be used to stretch and unzip DNA molecules while measuring the displacements of trapped particles from their trapping centers with sub-nanometer accuracy and precision.

18 Claims, 26 Drawing Sheets

Related U.S. Application Data

(60) Provisional application No. 62/653,486, filed on Apr. 5, 2018.

(58) Field of Classification Search
USPC .......................................................... 359/368
See application file for complete search history.

(56) References Cited

OTHER PUBLICATIONS

PCT Search Report and Written Opinion, PCT Appl. No. PCT/US2019/26150, dated Jun. 5, 2019, 9 pages.
Killian, Jessica "A Time-Shared Dual Optical Trap With Sub-Nanometer Image-Based Position Resolution for Hybrid Instruments", Cornell Dissertation, Jan. 2017, 95 pages.

* cited by examiner

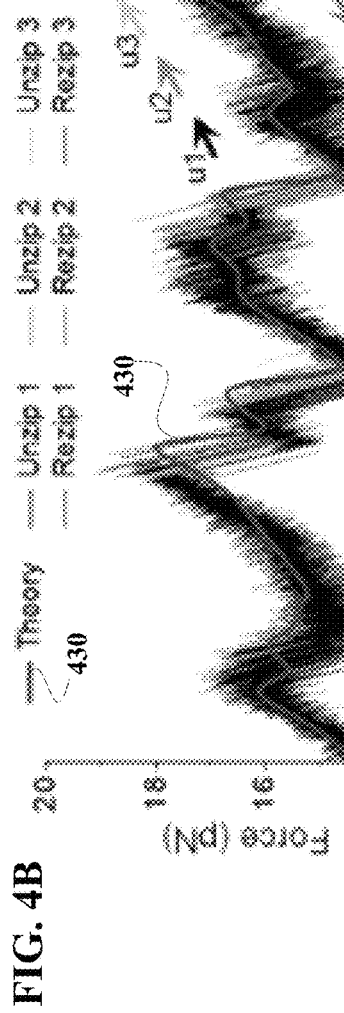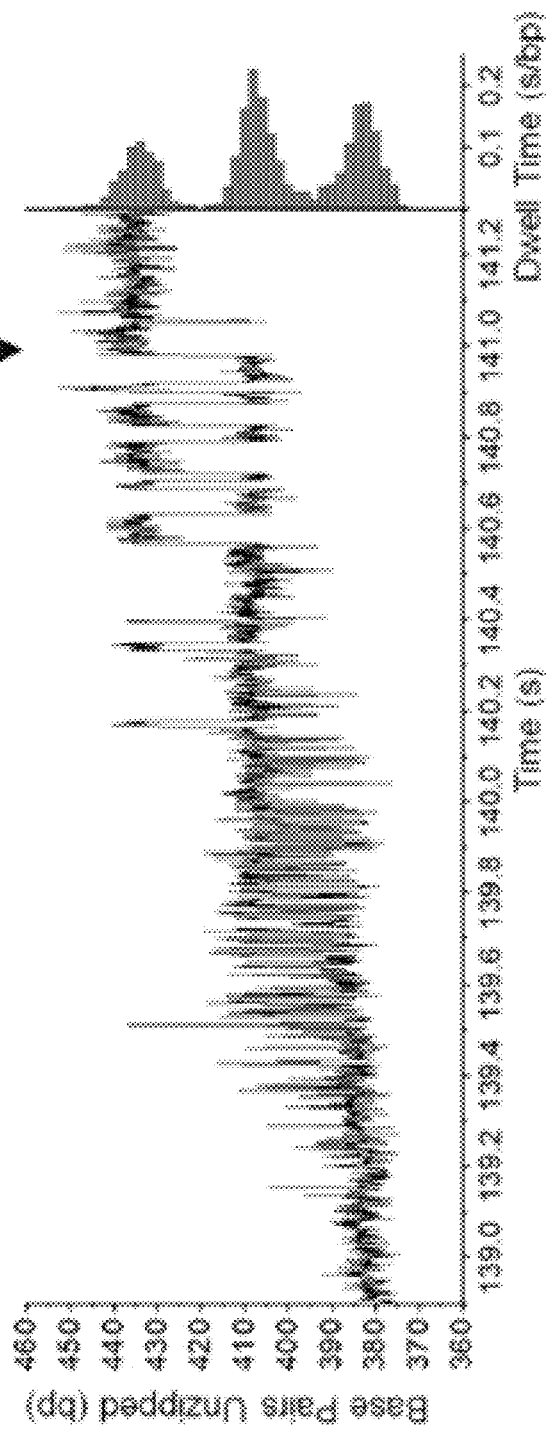
FIG. 4B
FIG. 4C
FIGs. 4B-4C

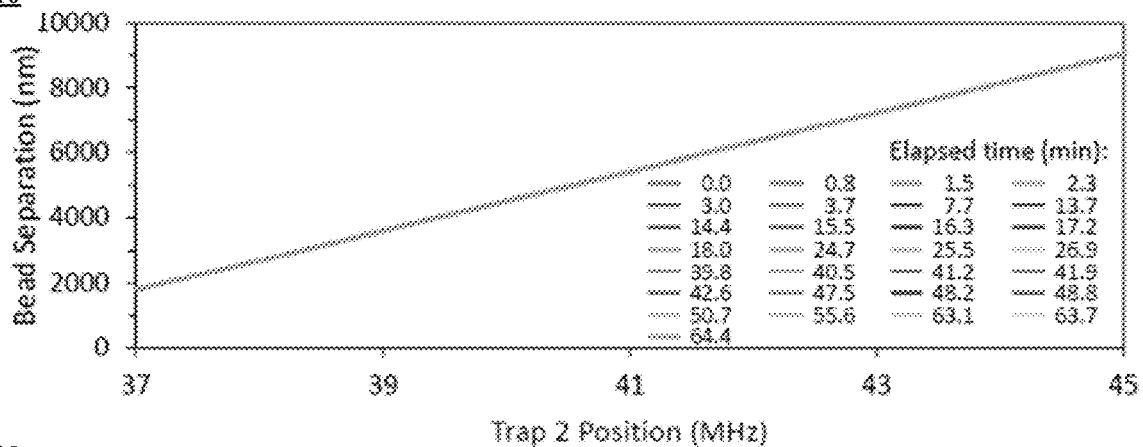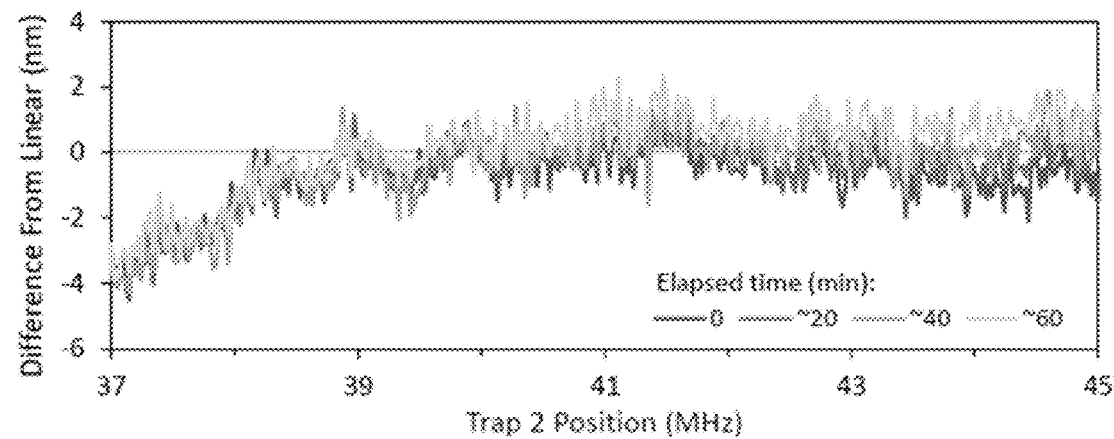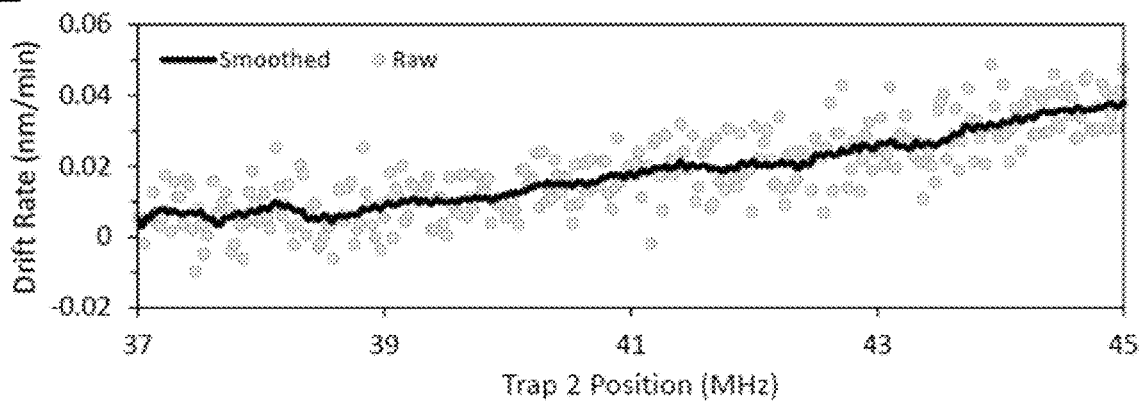
FIG. 11

TABLE 1

| Part | Manufacturer | Model No. |
|---|---|---|
| Trapping laser | IPG Photonics | YLR-5-1064-LP |
| Microscope objective | Nikon | CFI Plan Apo IR SR 60xWI |
| Lenses, waveplates, beam splitters | Newport | Various |
| Dichroics, Filters | Chroma, Thorlabs | Various |
| Microscope piezo stage | Physik Instrumente | P-517.3CL |
| Microscope motorized stage | Zaber | T-NA08A25-KT01 |
| High-powered LED | Thorlabs | SOLIS-445C |
| High-powered LED driver | Thorlabs | DC-2200 |
| Low-powered LED | Luxeon | MR-D2050-20S |
| Low-powered LED driver | Thorlabs | LEDD1B |
| AOD | Gooch and Housego | R45035-3-6.5DEG-1.06 |
| RF synthesizer | Gooch and Housego | N64010-200-2ASDFS-2 |
| High speed photodiode | Thorlabs | DET20C |
| Trap control FPGA | National Instruments | PCIe-7852R |
| Image tracking FPGA | National Instruments | PCIe-1473R |
| I/O Extension Board (Accessory) | National Instruments | Part #: 780869-01 |
| High-speed tracking camera | Mikrotron | CAMMC1362 |
| Low-speed camera | Andor | iXon 897 Ultra |
| Programming | National Instruments | LabVIEW 2015 |

FIG. 18

TABLE 2

| | |
|---|---|
| HincII<br>Figs. 5, 6 | 5'-GGATCTGCTGGCTAAGCTGAGCCAGTCTGGTCACAAGCGTATCGAAACGCTG<br>TTCACCAACGATCTGGATCACGGCCCATATACGGAAACCTTACGTGAC<br>CAACTAACGACCGTCTGAGCGCACTGGTAGAAATCTACCGCATGATGCGCCCTGG<br>CGAGCCGCCGACTCGTGAAGCAGCTGAAACGCCTCTTCGAGAACC-3' |
| XbaI<br>Fig. 6 | 5'-AGAGACTTAAAAGATTAATTTAAAATTTATCAAAAGAGTATTGACTTAAAG<br>TCTAACCTATAGGATACTTACAGCCATCGAGAGGACACGGGGATCCTCTAGAG<br>TGCTTGGCGAACCGGGTGTTTGACGTCCAGGAATGTCAAATCCGTGGCGGTGACCTA<br>TTCCGCACCGCGTTAAACTGCGTCTGGTGATCTATGAGC-3' |
| BsiWI<br>Fig. 6 | 5'-GTAAAACCACTCTTCGGTAAAGTGCTGTATAACGCGTATCATCCCTTA<br>CCGTGGTTCCTGGCTTCGGACTTCGAATTCCGAAGGACAACCTGTTTGTACGT<br>ATCGACCGTCGCGCTAAACTGCCATCATTCTGCGCCCTGAACTACA<br>CCACAGAGACAGATCCCTCGACCTGTTCTTTGAAAAGTTATCTTT-3' |
| HincII<br>Fig. S7,<br>Video 1 | 5'-CAACCGTGCATTGATGGTGCGAACATGCAAGCGTCAGGCCGTTCCGACTCTG<br>CGGCTGATAAGCCGTTGGTTATGCGAACGTGCTGTTGCCGTTGACT<br>CCGGTGTAACTGCGTAAACTGCGTAAACGTGGTGTTGGTCAGTACGTGGATGCTTC<br>CCGTATCGTTATCAAAGTTAACGAAGACGAGATGATCCGGGTGAAGCAGGTATC<br>GACATCTACACCCGTTCTAACACCCGACCAAATACCCGTTCTAACCTGTATCAACC<br>AGATGCCGTGTG-3' |

FIG. 19

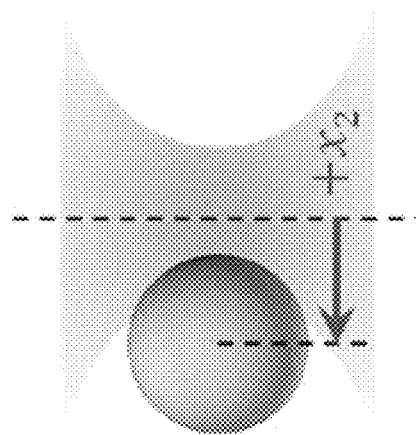
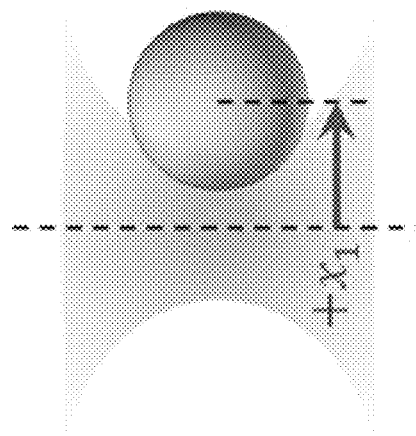
FIG. 20

IMAGE-BASED MEASUREMENTS OF BIOLOGICAL FORCES IN A DUAL OPTICAL TRAP

CROSS REFERENCE TO RELATED APPLICATIONS

This patent document is a continuation of International Patent Application No. PCT/US2019/026150, filed Apr. 5, 2019, which claims priority to and benefits of U.S. Provisional Patent Application No. 62/653,486, entitled "IMAGE-BASED MEASUREMENTS OF BIOLOGICAL FORCES IN A DUAL OPTICAL TRAP," filed on Apr. 5, 2018. The entire content of the above patent application is incorporated by reference as part of the disclosure of this patent document.

STATEMENT REGARDING FEDERALLY SPONSORED RESEARCH

This invention was made with government support under Grant Number T32GM008267 awarded by the National Institutes of Health and Grant Numbers MCB-0820293 and DGE1144153 awarded by the National Science Foundation. The government has certain rights in the invention.

TECHNICAL FIELD

The technology disclosed in this patent document relates to devices that create optical traps.

BACKGROUND

Optical traps (OTs) may be used to measure forces and distances. The determination of molecular forces relies on a determination of the displacement of a trapped microsphere (bead) from the trap's center. The bead may be a reporter particle attached to a biomolecule of interest. Previous systems have used back-focal-plane interferometry (BFPI) which uses a photodiode to measure the deflection of the trapping laser that occurs when a bead is displaced from the trap's center. Improved methods of particle tracking are needed.

SUMMARY

Disclosed are optical trap (OT) devices to measure forces and distances related to biomolecules. The optical trap devices include camera-based particle tracking which makes measurements of positions and distances in a sample plane. Optical traps for image-based force measurements use the bead's displacement from trap center. Disclosed herein is a dual optical trap and camera-based detection technique that measures a displacement, such as the average displacement, of the beads within the optical traps with sub-nanometer precision and sub-nanometer accuracy in real time. The disclosed techniques may be used in a wide variety of single-molecule studies involving proteins, enzymes, and nucleic acids such as stretching and unzipping DNA molecules and localizing bound proteins with sub-base-pair precision. Disclosed herein is a system that utilizes a dual optical trap, created by time-sharing a single laser trap between two locations in the sample plane. Because they share identical optical paths, traps generated by timesharing are self-consistent in their relative positions. An acousto-optic deflector (AOD) may be used to timeshare traps providing low-noise and high-stiffness traps and allow independent control of the trap powers and positions along a single axis.

In one aspect, an optical trap device is disclosed for determining forces including biological forces or distances. The optical trap device includes a trapping laser light forming two coherent beams. The optical trap device further includes photodiodes to monitor powers from the two coherent beams, wherein a closed loop feedback causes the powers of the two coherent beams to be approximately equal. The optical trap device includes a trapping light module located to receive the two coherent beams and to focus the two coherent beams at two optical trap locations to form two optical traps, wherein each optical trap illuminated by one of the two coherent beams is operable to spatially confine a bead. The optical trap device further includes a camera located to capture images of the two optical trap locations, and an image processor coupled to receive output of the camera to receive the images of the two trapped beams to track the positions of the two trapped beads over time.

In another aspect a method is disclosed for determining biological forces or distances. The method includes generating, by an optical trap device producing a trapping laser light, two coherent beams. The method further includes monitoring, by photodiodes, powers from the two coherent beams, wherein a closed loop feedback causes the powers of the two coherent beams to be approximately equal. The method includes receiving, at a trapping light module, the two coherent beams and to focusing the two coherent beams at two optical trap locations to form two optical traps, wherein each optical trap illuminated by one of the two coherent beams is operable to spatially confine a bead. The method includes capturing, by a camera, images of the two optical trap locations with the two beads in the two optical traps, and processing, by an image processor, the images of the two trapped beams to track the positions of the two trapped beads over time.

The following features may be included in various combinations. Another camera may view the two beads in the two optical traps illuminated by a first light emitting diode, wherein the other camera aids in tether formation and sample chamber navigation. A force such as an average force applied to the two beads may be determined by half the difference of the distance between the two traps and the distance between the two beads. The distance between the two traps may be determined before, after, or concurrently with the measurement of the distance between the two trapped beads. The image processor may be implemented in a field programmable gate array (FPGA). The optical trap device may be included in a microscope. The camera may be illuminated by a light emitting diode. The trapping light may have a wavelength of 1064 nanometers (nm), and the light emitting diode may have a wavelength of 445 nm. The two coherent beams may be generated by timesharing light from the trapping laser via an acousto-optic deflector (AOD).

BRIEF DESCRIPTION OF THE DRAWINGS

FIG. 4B depicts an example of a single DNA molecule unzipped until just before strand dissociation and then rezipped.

FIG. 4C depicts an example of a portion of the data in FIG. 4B that was converted to the number of base pairs unzipped vs time.

FIG. 11 depicts examples of bead separation calibration LUT stability, in accordance with some example embodiments.

FIG. 18 depicts an example of a parts list for an example system, in accordance with some example embodiments.

FIG. 19 depicts examples of DNA sequences of protein binding vicinities.

FIG. 20 illustrates force determination in a dual optical trap, in accordance with some example embodiments.

DETAILED DESCRIPTION

The disclosed subject matter includes optical traps (OTs) that can be used to measure forces and distances at a nanoscale while actively manipulating individual nano- to micron-sized objects, including biomolecules. OTs can determine molecular forces with sub-piconewton accuracy on sub-millisecond time scales using the displacement from the trap's center of a trapped microsphere (bead), a reporter particle attached to a biomolecule of interest. Previously, the technique of back-focal plane interferometry (BFPI) used a photodiode to measure bead displacement from trap center. BFPI has enabled the observations of single base-pair (bp) steps by translocating motor proteins and the detailed characterization of histone-DNA interactions with near-base-pair resolution.

Figure 1A:
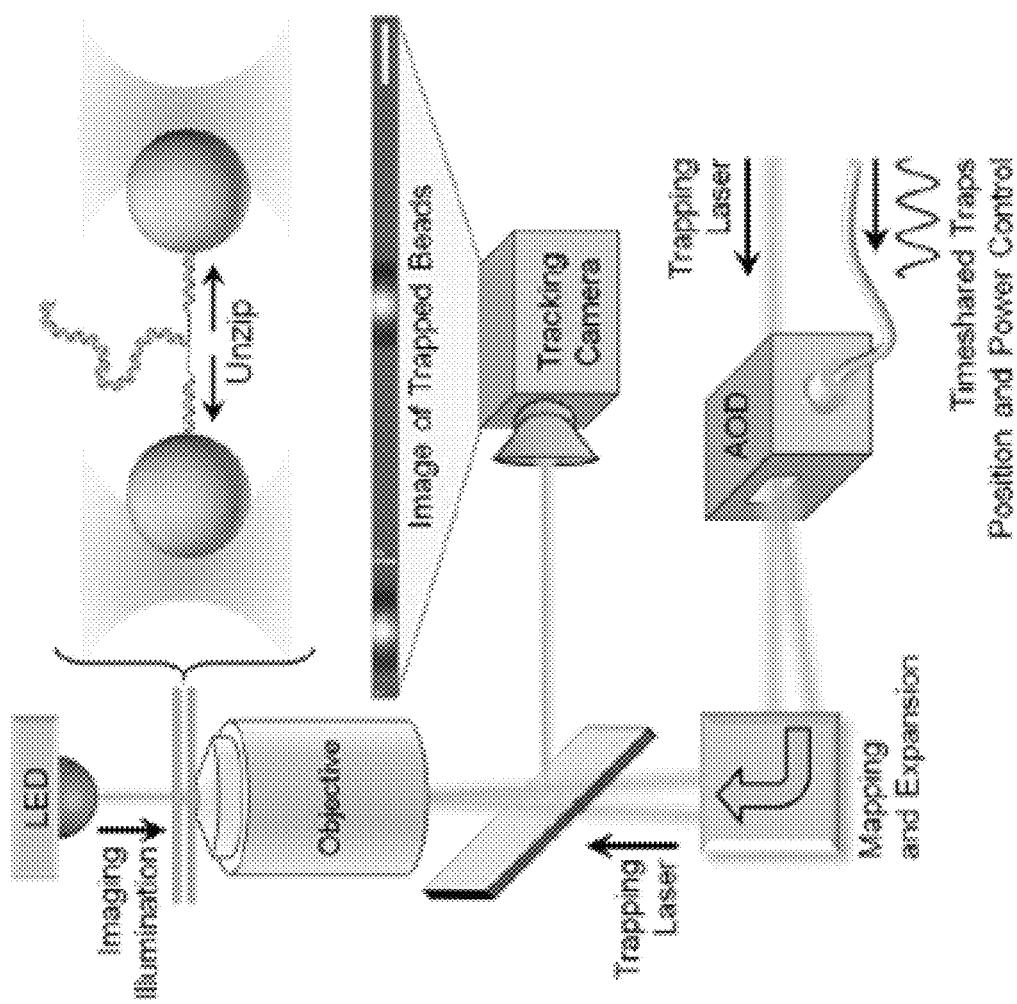
FIGS. 1A and 1B depict an example of a system, in accordance with some example embodiments.
Figure 1B:
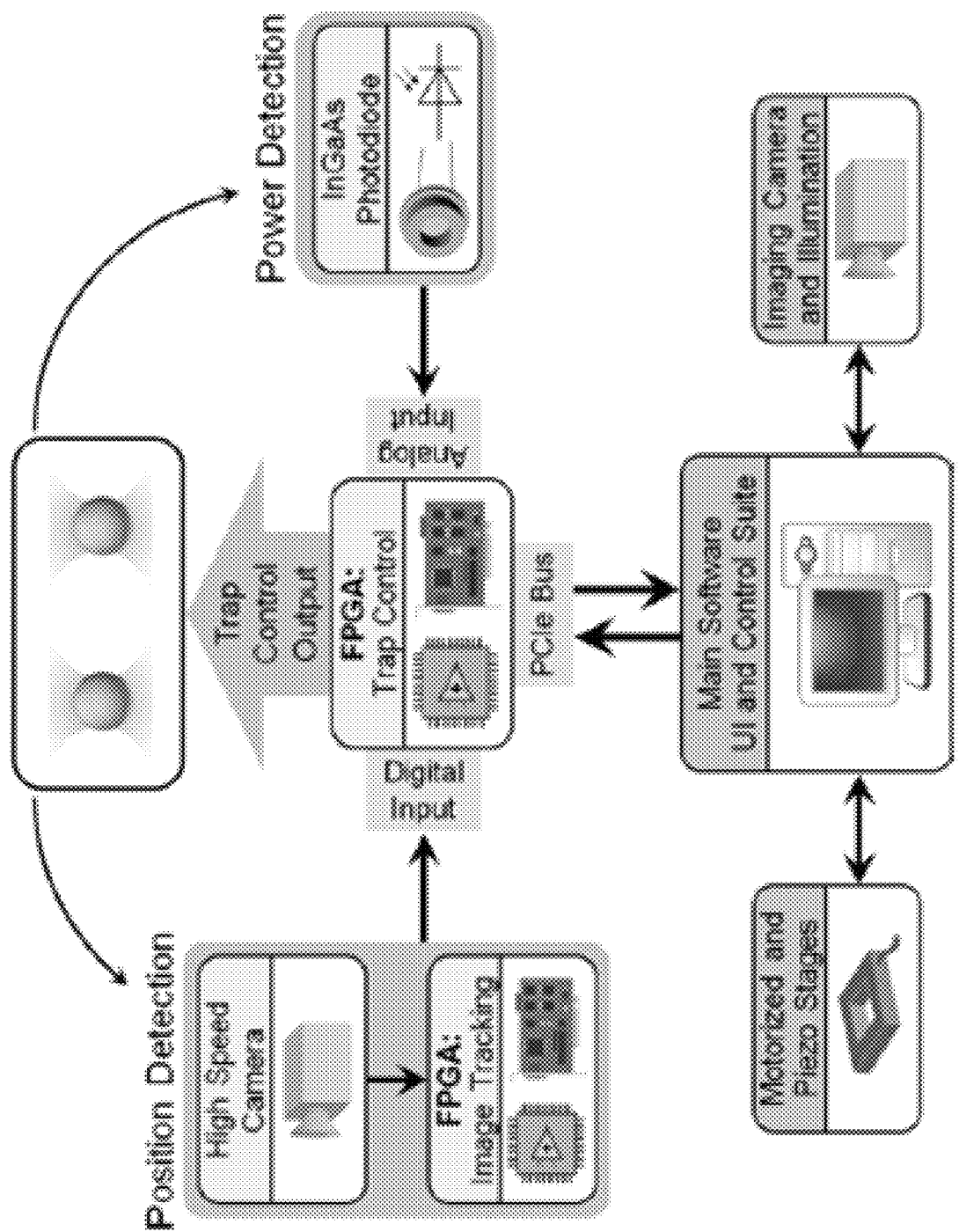
Figure 7:
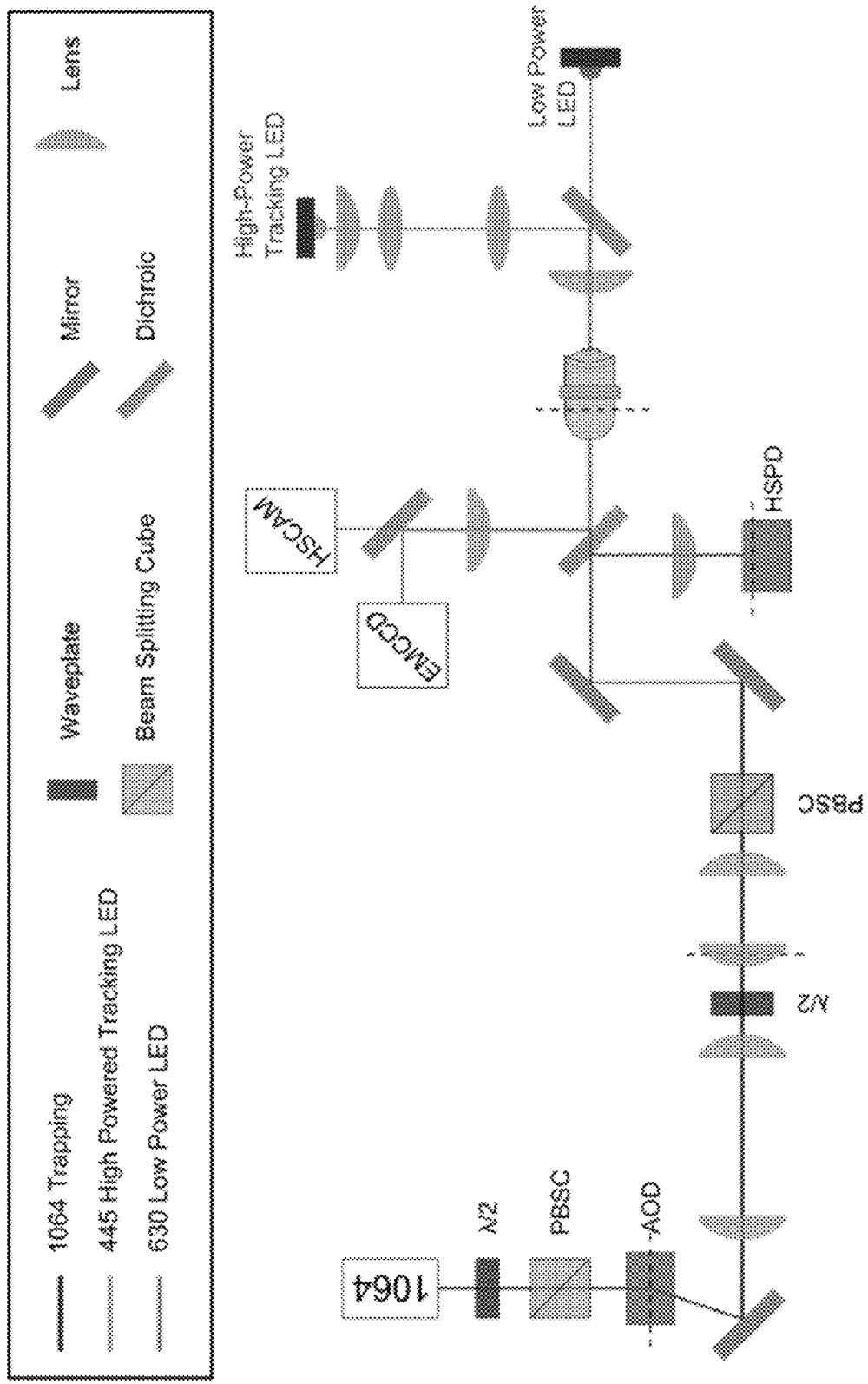
FIG. 7 depicts an example of a system layout, in accordance with some example embodiments.

In an example embodiment, a system is disclosed with a time-shared dual optical trap, a light source, and a high-speed camera (See, for example, FIGS. 1A and 1B, and FIG. 7). The system performs a technique for measuring dual optical trapping forces accurately using image data from a camera. A field-programmable gate array (FPGA)-based image particle tracking system is disclosed that operates on image data from mobile traps that is fast, accurate, and has very low latency. The image tracking FPGA and a disclosed trap control FPGA enable low-latency tracking that is needed to achieve good measurement accuracy.

The disclosed camera-based particle tracking is better than BFPI due to its ability to make direct measurements of positions and distances in the sample plane, its flexibility, and its relative ease of implementation. The use and efficacy of image tracking in scientific instruments has improved due in part to improved digital camera technology including improved data bandwidth, sensor noise, and real-time tracking techniques. Image tracking may be used to track the absolute positions of reporter particles that are tracked with sub-nanometer precision at multi-kilohertz speeds and can be used to localize optically trapped particles in solution with similar precision and speed. Optical traps present challenges for real-time image-based force measurements such as determining the bead's displacement from trap center, rather than its absolute position. Previously, cameras have shown only the bead's absolute position and offer no coincident measure of trap position. In practice, even the most precise predetermined estimates of trap position in the sample plane may be rendered inaccurate by laser pointing fluctuations and drift, which alter trap position by tens to hundreds of nanometers over experimental time scales.

The dual optical trap and a set of camera-based detection techniques disclosed herein overcome the challenges above as well as others. The biological forces can be determined by measuring the relative displacement of the beads within the optical traps with both sub-nanometer precision and sub-nanometer accuracy. This is accomplished across a trap movement range of nearly 10 μm and at up to 10 kHz in real time using a low-latency tracking system in a field-programmable gate array (FPGA). The device can be used to stretch and unzip DNA molecules, and then use the DNA unzipping technique to localize bound proteins with sub-base-pair precision. Thermal DNA fluctuations enable an approaching unzipping fork to detect and respond to a bound protein that is downstream of the fork's mean position.

The performance of a camera-based optical trap detection depends on a stable optical trap and an image tracking system. The disclosed system and device utilizes a dual optical trap, created by time-sharing a single laser trap between two locations in the sample plane. Because they share identical optical paths, traps generated by timesharing are self-consistent in their relative positions. An acousto-optic deflector (AOD) can be used to timeshare the traps at 50 kHz (or another frequency), provide a low-noise and high stiffness trap and allow independent control of the trap powers and positions along a single axis. See, for example, FIG. 1A, FIG. 7, and FIG. 18 at Table 1.

The AOD can be driven by an RF synthesizer, which can be controlled using an FPGA. The FPGA may act as a system controller that performs acquiring and processing instrument data and determining and causing driving signal for the RF synthesizer to be generated to control the optical traps (see, for example, FIG. 1B). Trap powers may be measured for each trap individually by a high-speed photodiode and stabilized via feedback (see, for example, FIG. 8). Bead position detection is performed by a high-speed camera connected directly to a different (or the same) FPGA used for tracking bead positions. In this way, the system performs data acquisition, feedback, and instrument control, executed with hardware-timed determinism on the FPGA. One or more FPGAs may have a clock rate such as 40 MHz, and/or one or more control/signal processing functions may be performed using LabVIEW, machine code, or other programming language.

Achieving both high-speed and precise image tracking requires a low-noise camera sensor and a bright light source to provide adequate illumination at sub-millisecond camera exposures. A cropped region of interest (FIG. 1A) may be acquired at up to 10 kHz (or a higher peak frequency) using a CMOS camera illuminated by an LED. Additionally, a 4× optical magnification on top of a 60× water-immersion objective, results in images scaled at 57.3 nm per camera pixel. Large image magnification improves tracking accuracy by reducing the relative contributions, if present, of tracking algorithm bias and camera fixed pattern noise. Once acquired, image data from the camera may be transferred to the image tracking FPGA for processing.

FIGS. 1A and 1B depict an example of a system, in accordance with some example embodiments. FIG. 1A depicts dual optical traps generated by timesharing a single laser via an AOD, which controls the positions and powers of both traps in the sample plane. Beads are imaged at up to 10 kHz (or another frequency) for position tracking using a high-speed camera. The scale bar is in FIG. 1A is 400 nm. FIG. 1B depicts an example of control flow of a system, in accordance with some example embodiments. An FPGA for trap control generates the driving signal to control the AOD (and, thus, the traps) of FIG. 1A and acquires and processes instrument data including trap powers from a high-speed photodiode and bead positions from a second (or the same) FPGA for image tracking. Acquired data sampled at up to 50 kHz (or another frequency) is streamed may be streamed to the controller and/or storage device such as hard disk, or solid state memory.

Cross-Correlation Image Tracking FPGA

Real-time image tracking at high camera frame rates generates large amounts of data, which strains the throughput capabilities of software tracking requiring a specialized solution for accelerated processing. In some example embodiments, all or part of an image tracking algorithm may be performed using a graphics processing unit (GPU) or an FPGA. An FPGA provides a hardware implementation for tracking providing superior determinism and low latency which is useful for real-time control applications. In some example embodiments an improved hardware implementation for tracking is disclosed that performs mirror cross-correlation (MCC) image tracking (see, for example, FIG. 2A) on an FPGA platform to realize ultralow-latency particle tracking in real time.

Figure 2A:
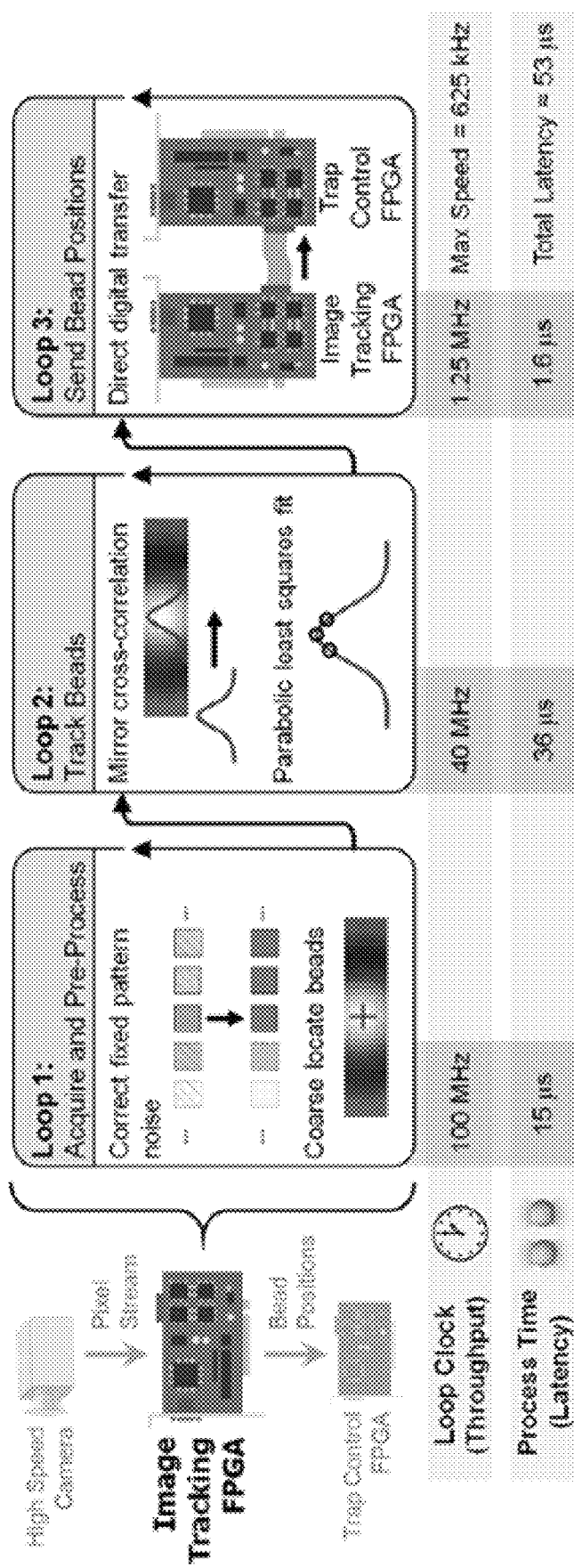
FIG. 2A depicts a process flow for FPGA image tracking using a cross-correlation algorithm, in accordance with some example embodiments.
Figure 2B:
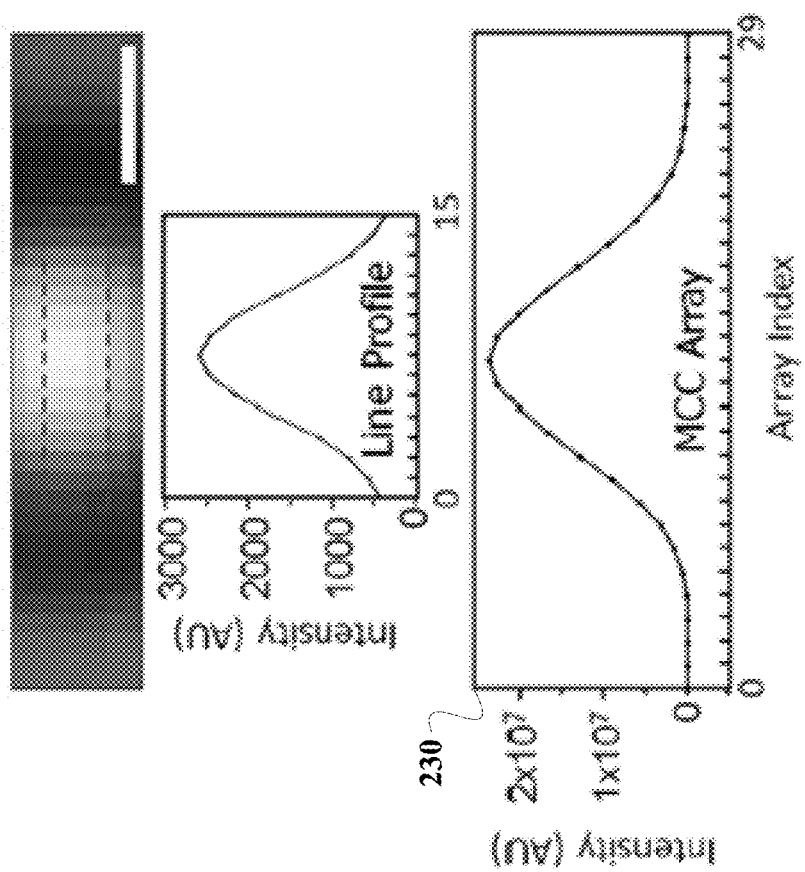
FIG. 2B depicts an image of an 800 nm polystyrene bead cropped from 10-bit experimental image data, in accordance with some example embodiments.
Figure 2C:
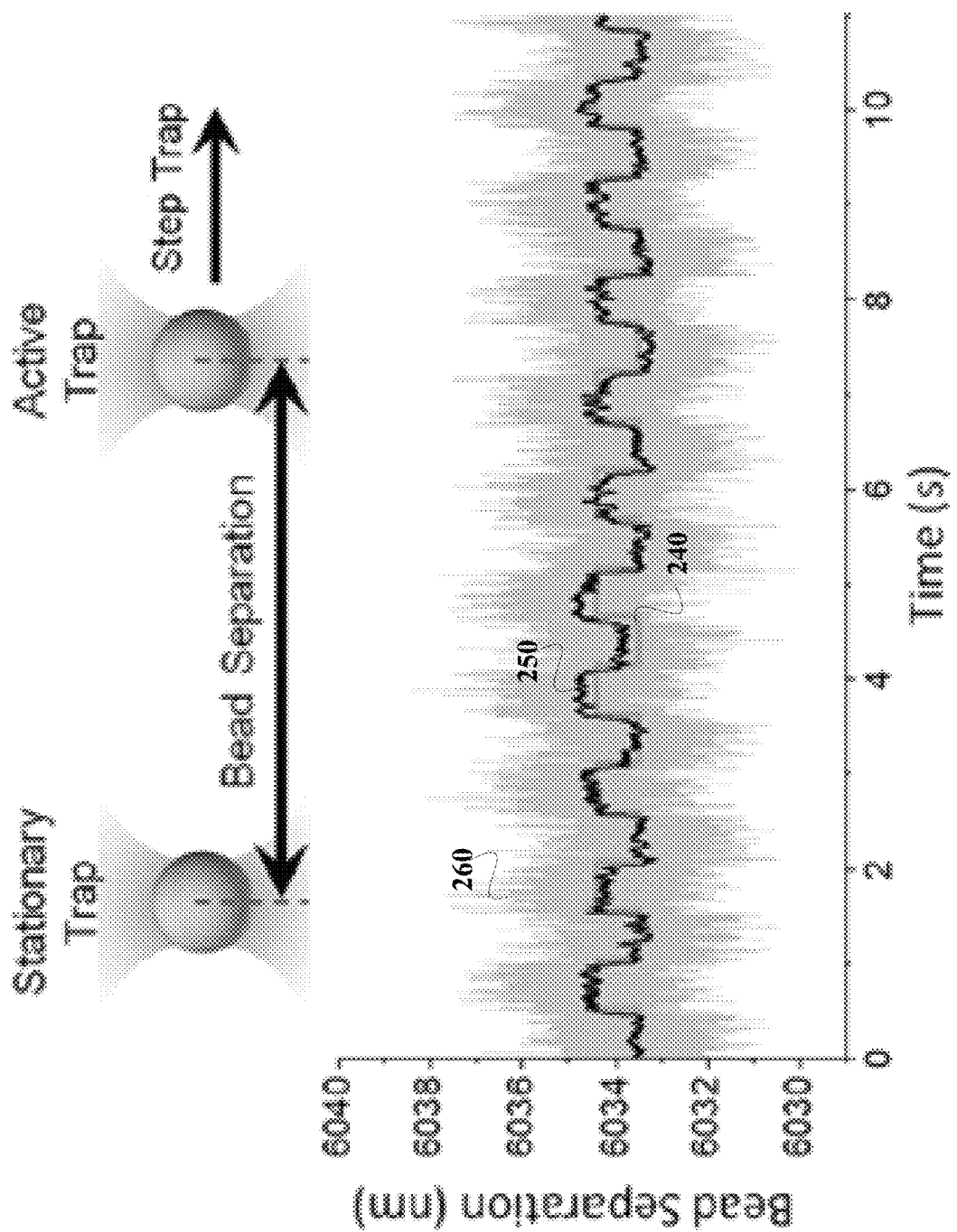
FIG. 2C depicts a bead in each trap and a trapping stiffness of ~0.5 pN/nm where one trap is stationary and the other trap is stepped in increments of 0.9 nm while measuring the bead separation, in accordance with some example embodiments.

FIG. 2A depicts a process flow for FPGA image tracking using a cross-correlation algorithm implemented in three independent loops: the loop first for image preprocessing, the second loop for bead tracking, and the third loop for data transfer. FIG. 2B depicts an image of an 800 nm polystyrene bead cropped from 10-bit experimental image data, with a corresponding line profile shown below. The result from the cross-correlation of the line profile with its mirror image (an MCC array) is shown at 230. The scale bar is in FIG. 2B is 400 nm. FIG. 2C depicts a bead in each trap and a trapping stiffness of ~0.5 pN/nm where one trap is stationary and the other trap is stepped in increments of 0.9 nm while measuring the bead separation. The raw data (2.5 kHz) is shown at 260, while at 250 the trace is filtered to 250 Hz. The trap control driving signal is shown at 240.

Image pixels may be streamed from the camera to the image tracking FPGA, where the camera's fixed pattern noise can be corrected and the positions of the bead centers can be determined. The beads may be tracked in one dimension (along the tethering axis), which is sufficient to reach the thermal limit of detection in dual optical traps. The bead positions may be sent to the trap control FPGA over wired digital connections. In some example embodiments, the system may permit the tracking and transfer of the dual bead positions at 625 kHz (or another frequency), with a low latency between the finished camera exposure and the completed transfer of both tracked bead positions. For example, the latency may be about 50 µs. The tracking exhibits both high precision and high accuracy; the variance in the tracked position of a bead fixed firmly to a coverslip stays below 0.2 nm$^2$ through 10 kHz acquisition rates, and a histogram of sub-pixel bead positions may show minimal bias (see, for example, FIG. 9). Sub-nanometer changes in the separation between two trapped 800 nm beads (See, for example, FIG. 2C) may be present.

A graphics processing unit (GPU) is a natural choice for image processing, as they are specialized hardware designed specifically to perform image processing. They excel at performing floating-point computations on arrays, which is the basis of most image processing algorithms. They are not, however, designed for real-time control applications where low latency is needed. FPGAs or application specific integrated circuits (ASICs) are the implementation of choice where low latency for real time control is required. However, some challenges with some FPGAs include that they often lack native floating point support and have limited resources. For example, a typical FPGA lacks sufficient resources to compute the determinant of a 10×10 matrix, whereas advanced image processing algorithms performed on GPUs regularly compute the determinant of matrices with thousands of elements. FPGAs are also more challenging to program. Because of these limitations, image processing on FPGAs in single molecule instruments has been limited to simple but inaccurate algorithms like the center of mass algorithm. Overcoming the challenges listed above, disclosed herein is an advanced image tracking algorithm involving cross-correlation and least-squares fitting on an FPGA for the first time, providing both accurate and precise image tracking with deterministic processing times with ultra-low latency.

Figure 2D:
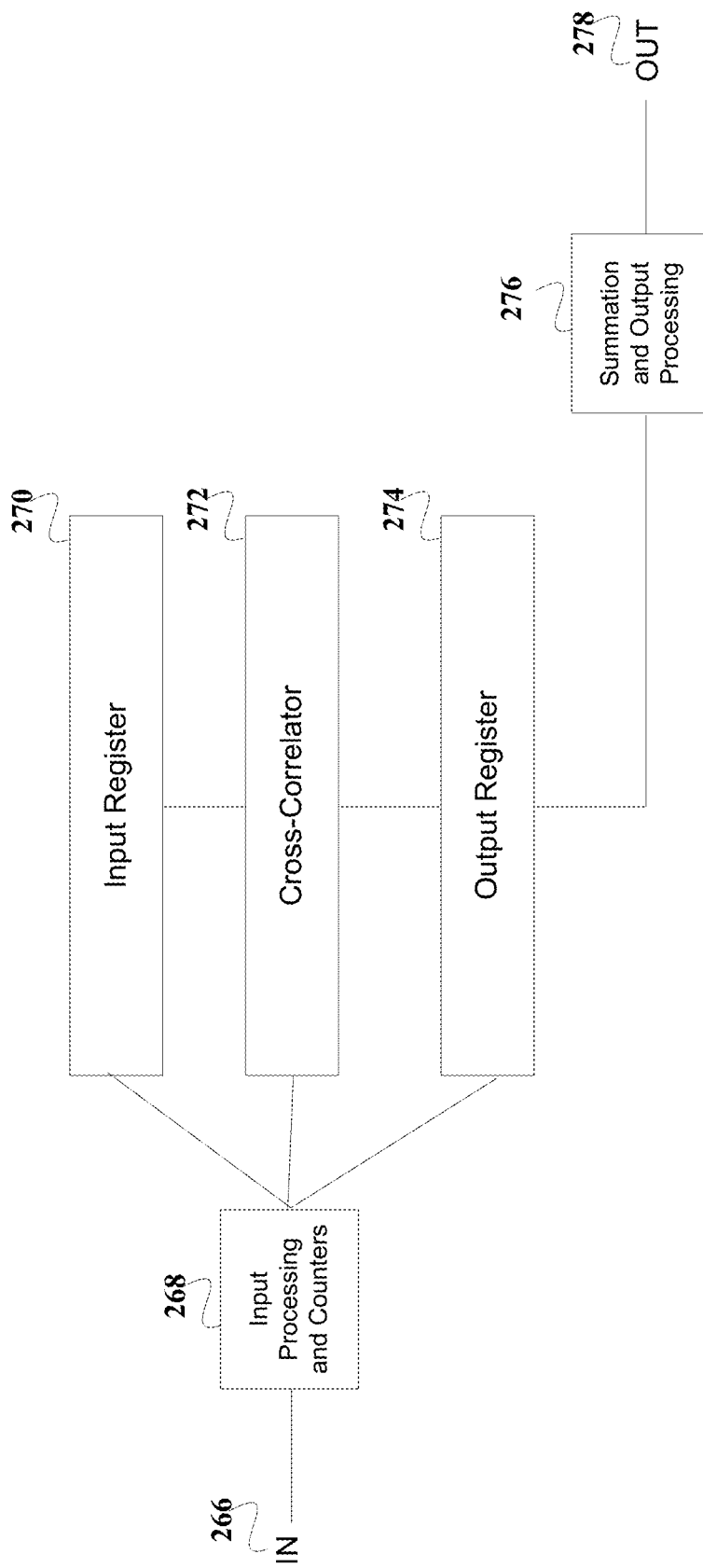
FIG. 2D depicts an example of a functional diagram for image tracking using a cross-correlation algorithm implemented in an FPGA, in accordance with some example embodiments.

FIG. 2D depicts an example of a functional diagram for image tracking using a cross-correlation algorithm implemented in an FPGA, in accordance with some example embodiments. Input data is provided to the FPGA at 266. At 268, input processing is performed, and counters are cleared and/or started. At 270, data is loaded into an input register. At 272, a cross-correlator operates on the data from the input register and produces data for the output register. At 276, summation and output processing are performed to produce output 278. The foregoing functions may be changed or replaced with other functions disclosed in this patent document. In some example embodiments, the registers at 270 and/or 274 may be replaced with latches, flip-flops, and/or other logical devices.

Accurate Force Measurements in Mobile Traps

Figure 3A:
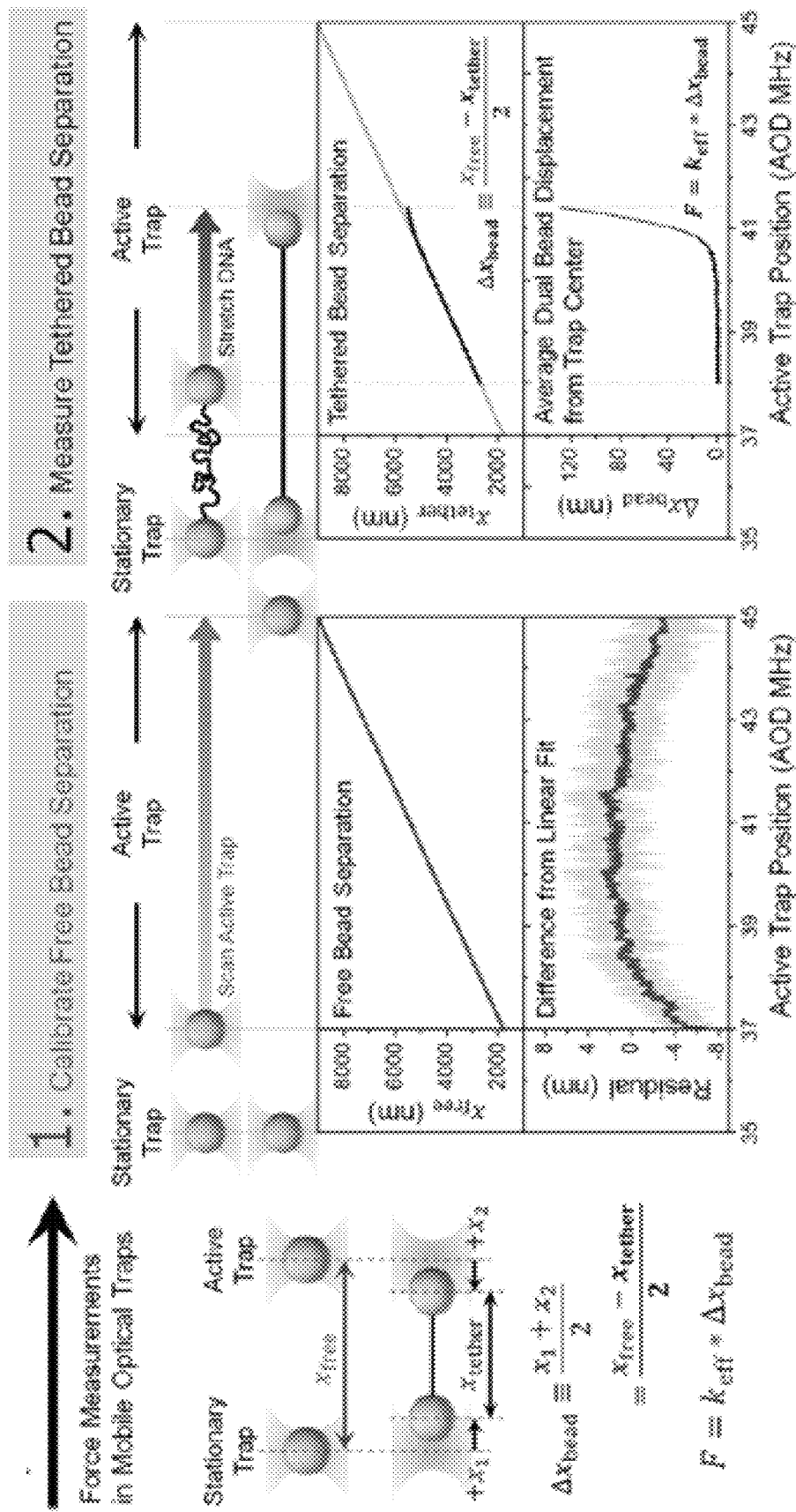
FIG. 3A shows force in a dual optical trap can be expressed in terms of the relative trap separation coordinate, in accordance with some example embodiments.

For small bead displacements from the trap centers, force in a dual optical trap can be expressed as $F=k_{eff} \cdot \Delta_{X_{bead}}$, where $k_{eff}$ is the effective trap stiffness of the two traps and $\Delta_{X_{bead}}$ is the average displacement of the two trapped beads relative to their respective trap centers (see, for example, FIG. 3A and FIG. 20). While image tracking is suited to the task of determining absolute bead positions in the sample plane, the uncertainty in the concurrent trap positions limits the accuracy of individual trap force measurements in real time. However, while the position of an optical trap in the sample plane fluctuates and drifts, the separation between two traps generated from a single laser source may be much more stable (see, for example, FIG. 10). The disclosed technique for measuring force (see, for example, FIG. 3A) uses the enhanced stability of differential detection in a dual optical trap by forgoing the use of absolute positions altogether and relying on an expression of $\Delta_{X_{bead}}$ that uses only separations.

A process may begin by calibrating the separation of the traps. With an untethered (free) bead in each of the two traps, the separation between them ($x_{free}$) can be tracked as we maintain one trap stationary and step the second trap across its remaining mobile range. The free bead separation, reflecting the absence of an externally applied force, represents the center-to-center distance between the two traps. The measured trap separation at each AOD frequency of the active trap (which drives its position in the sample plane), may be determined and sent to the trap control FPGA that may be used in a look-up-table (LUT). FIG. 3A illustrates the use of a LUT to enhance measurement accuracy where the trap response to the control signal is nonlinear.

Figure 3B:
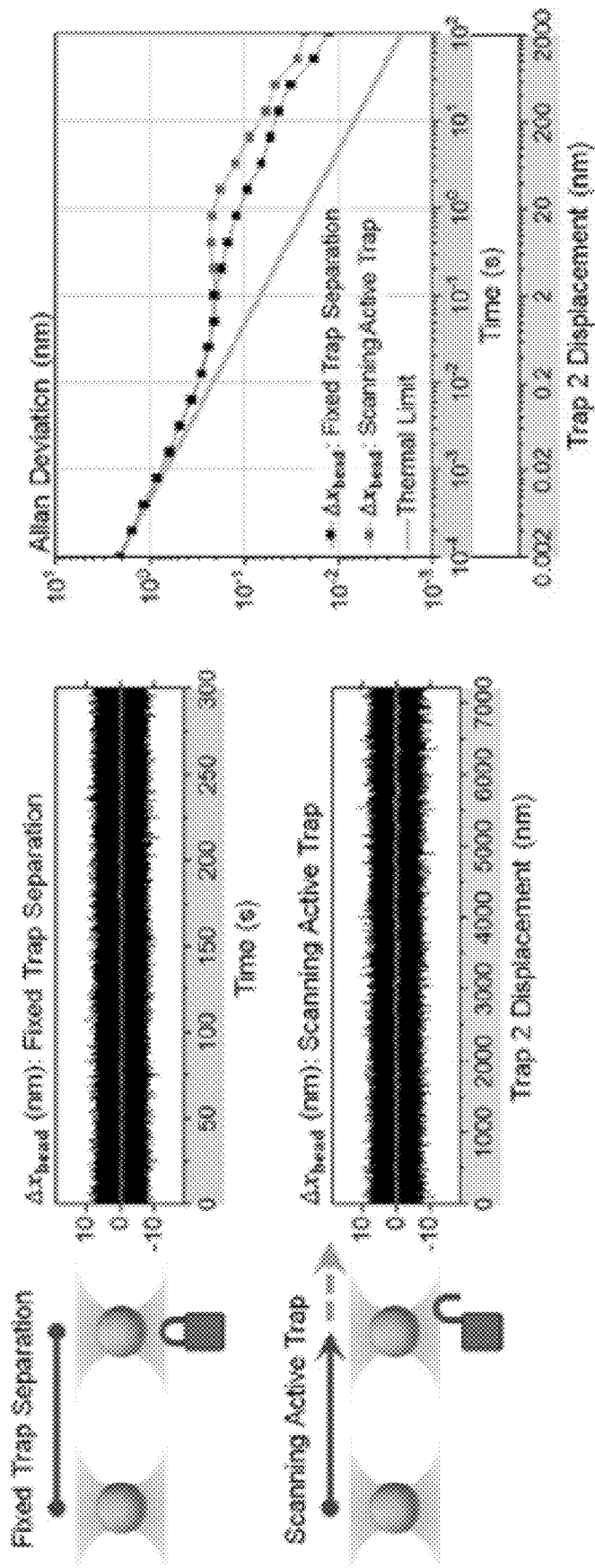
FIG. 3B depicts an example of the Allan deviation (ADEV) of the $\Delta_{x_{bead}}$ signal for stationary traps compared to the ADEV of the $\Delta_{x_{bead}}$ signal, in accordance with some example embodiments.

FIGS. 3A-3B depict image-based force measurements with mobile traps. FIG. 3A shows force in a dual optical trap can be expressed in terms of the relative trap separation coordinates $x_{free}$ and $x_{tether}$. The free bead separation, $x_{free}$, versus the position of the active trap is first measured and stored as a look-up-table (LUT), ofr example, on the trap control FPGA. Half the difference between $x_{free}$ indexed from this calibration LUT and)(tether measured during an experiment yields $\Delta_{X_{bead}}$ for each image frame. FIG. 3B depicts an example of the Allan deviation (ADEV) of the $\Delta_{X_{bead}}$ signal for stationary traps was compared to the ADEV of the $\Delta_{X_{bead}}$ signal as the active trap was scanned across its mobile range, revealing the accuracy of $\Delta_{X_{bead}}$ measurements in mobile traps.

When experiments with a biological substrate are performed, the stationary trap is fixed and the sample is manipulated via movement of the active trap while measuring the separation between the two beads ($X_{tether}$). The AOD frequency of the active trap serves to index the LUT of trap separation ($X_{free}$). Half of the difference between $X_{free}$ and $X_{tether}$ represents the average displacement of the beads in their respective traps for that image frame, $\Delta_{X_{bead}}$. The accuracy of this technique relies on the stability of the trap separation calibration LUT afforded by the time-shared dual optical traps, which confers the repeatability for a robust measurement of force. We characterize this by obtaining the Allan deviation (ADEV) of $\Delta_{X_{bead}}$ for two free beads as the active trap is scanned across its full movement range and comparing it with that of stationary traps over a comparable time period (see, for example, FIG. 3B). Inaccuracies in the LUT calibration of $X_{free}$ may manifest as nonphysical fluctuations in the measured value of $\Delta_{X_{bead}}$ as the active trap is scanned and a consequent increase in the ADEV of the moving traps relative to the stationary traps. The results show that this technique enables obtaining $\Delta_{X_{bead}}$ with sub-nanometer accuracy across the full mobile trap separation range. In testing, the drift of the calibration LUT over a time period of 1 h determined the drift rate to be on the order of 0.01 nm per minute, in some example embodiments, in the region of the LUT in which our data were obtained (see, for example, FIG. 11).

Stretching and Unzipping DNA.

Single-molecule optical trapping studies have use for the disclosed real-time measurements of biological forces and distances. To demonstrate an example of the disclosed system's high-quality data in single-molecule manipulation experiments, two optical trapping assays may be performed: stretching and unzipping DNA. In the testing, both experiments, $k_{eff}$ was held at ~0.3 pN/nm; thus, small inaccuracies in the measure of bead displacement would have a large effect on the measured force.

Figure 4A:
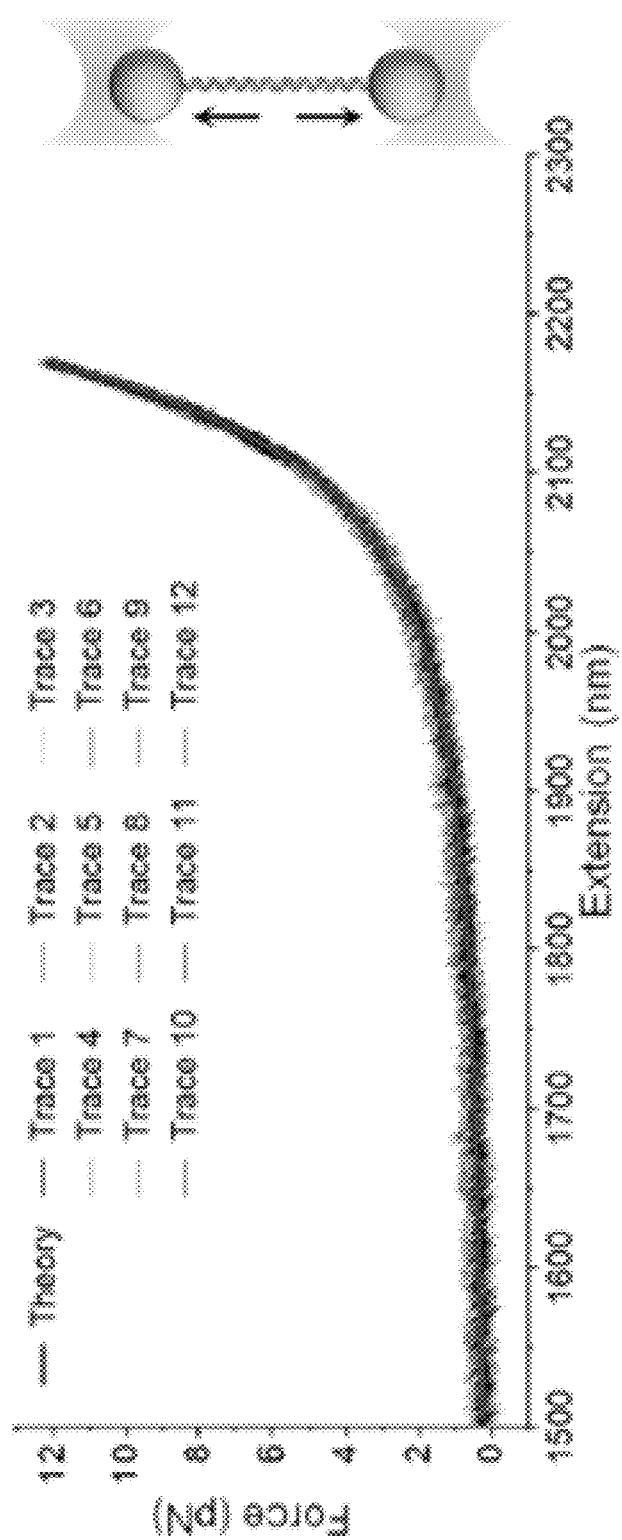
FIG. 4A shows examples of force-extension relationships from stretching individual duplex DNA molecules over the course of an hour.

Examples of the force-extension relationships from stretching 12 individual duplex DNA molecules over the course of an hour are shown in FIG. 4A, along with a theoretical prediction (not a fit). These data were aligned in extension via small (<10 nm) global offsets, accounted for by variations in bead diameters (see, for example, FIG. 12) but are unaligned in force. The disclosed system may be used to unzip DNA, which describes the mechanical disruption of the duplex DNA into its two constituent strands. In FIG. 4B, an example is shown of a zoomed-in region of raw, unaligned data obtained from the unzipping and rezipping of a single tether three times over a period of about 3 min. As the molecule is unzipped, the force is observed to vary according to the underlying base pair sequence, for which a prediction is shown at 430. The data for both stretching and unzipping exhibit excellent accuracy in both force and extension measurements, high stability, and low drift over experimental time scales.

FIG. 4C shows an example of a portion of the unzipping data from FIG. 4B, which has been converted to display the number of base pairs unzipped over time. With this presentation, sufficient bandwidth and precision is shown to resolve discrete hopping fluctuations between nearby unzipping states on millisecond time scales. This behavior is not unexpected; thermally driven "breathing" (rapid and spontaneous opening and closing of DNA base-pairing interactions) is highly characteristic of DNA fork junctions and is thought to play important regulatory roles in vivo.

FIGS. 4A-4C depict stretching and unzipping naked DNA. FIG. 4A depicts an example of a measured force-extension relationship for stretching 12 different DNA molecules are shown, and a prediction (not a fit). FIG. 4B depicts an example of a single DNA molecule unzipped until just before strand dissociation and then rezipped. In an example experiment, this process was performed three consecutive times over a period of about 3 min. The 10 kHz data is displayed without filtering or alignment. FIG. 4C depicts a portion of the data in FIG. 4B that was converted to the number of base pairs unzipped vs time. Rapid transitions on millisecond time scales between discrete unzipped states are visible. A dwell-time histogram is also shown.

Unzipping DNA may reveal a detailed and distinct force signature shaped by the underlying energy landscape of its sequence, and thus unzipping also serves as a tool for probing and localizing protein-DNA interactions. A bound protein presents a roadblock that increases resistance to unzipping, resulting in a detectable rise in force above the naked DNA baseline when the unzipping fork encounters the protein. The location of the force rise thereby communicates the location of the bound protein on its DNA substrate. The disclosed system unzipped through proteins bound to sequence specific sites on DNA molecules to localize their interactions. The experiments uncovered unexpected insights into the effects of fork breathing fluctuations on the protein unzipping process.

Figure 5:
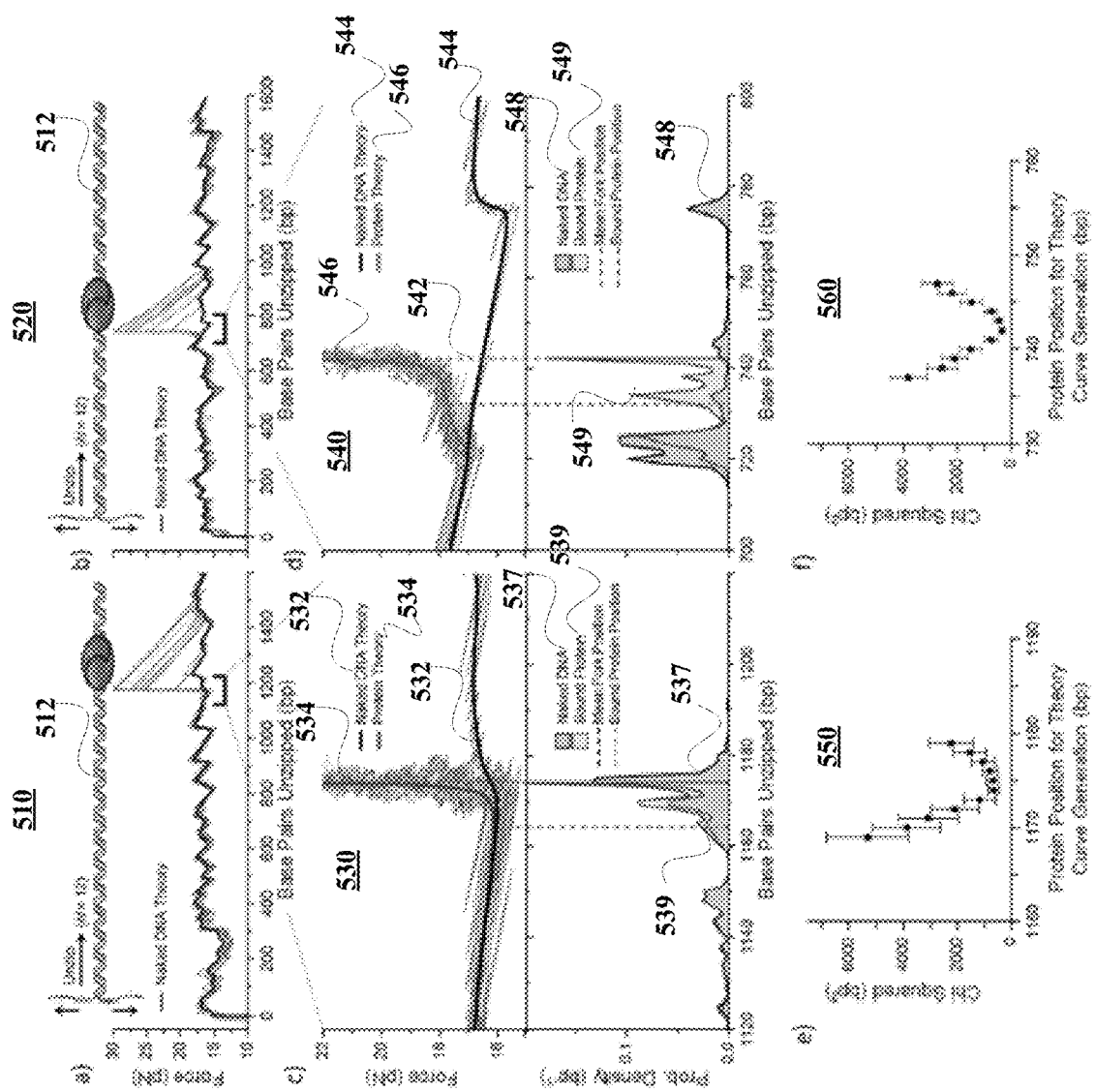
FIG. 5 depicts examples of two sets of data that were obtained by unzipping through the bound restriction enzyme HincII, in accordance with some example embodiments.

FIG. 5 shows two sets of data obtained by unzipping through the bound restriction enzyme HincII on the same DNA sequence but from opposite directions. Thus, the protein, its recognition sequence, and the sequence context of its binding site are the same for both data sets, but the DNA sequences unzipped upstream of the protein are distinct. Against the backdrop of the naked DNA unzipping trace, the bound protein produces a vertical force rise, occurring when the progression of the unzipping fork is impeded by the tightly bound protein (see, for example. FIGS. 5 at 510 and 520). Though one might anticipate a sharp transition from the naked DNA unzipping behavior into the protein's vertical force rise, the data revealed surprising deviations from the naked DNA unzipping trace beginning well before the expected vertical force rise (see, for example, FIGS. 5 at 530 and 540). Similar behavior was also observed for adjacent HincII binding sites unzipped from the same direction on a single DNA template (see, for example, FIG. 13). This phenomenon is consistent with just a single strong protein-DNA interaction, located at the position of the vertical force rise.

FIG. 5 shows a bound protein that modulates unzipping at a distance. At 510 and 520, the restriction enzyme HincII is bound to a DNA template and unzipped from either direction. A single naked DNA trace 512 is included for comparison. At 530 and 540 featured deviations from the naked unzipping data (gray) and theory (532,544) are observed as the protein is unzipped. This was predicted (red) by placing an infinite energy barrier at the base pair position indicated by the dashed line 542. Below the data is the calculated likelihood for the fork to reside at a given sequence position with (red) and without (black) a protein bound at the dashed line 542 for a mean fork position (538) 10 bp upstream of the protein location. A force rise relative to the naked DNA is observed when the protein perturbs the distribution of states the fork is able to explore through thermal fluctuations, which varies with the DNA sequence. At 550 and 560, theoretical protein unzipping signatures were generated for a protein bound at integer base positions along the DNA sequence, and the $X^2$ value of our measured unzipping data against each separate prediction was determined and fit with a parabola to extract the protein position with sub-base-pair precision (see, for example, FIG. 14).

A protein may affect the unzipping force many bases upstream of its binding location due to thermally driven breathing dynamics of the unzipping fork, which causes the fork's location within the DNA sequence (the number of base pairs unzipped) to fluctuate rapidly about its mean position for a given value of DNA extension. Consequently, both the average fork position and the average unzipping force at any given time reflect the cohort of unzipping states that the fork is able to explore, which varies with the underlying DNA sequence. GC-rich regions near the unzipping fork limit the extent of fork fluctuations due to their high base pairing energies, whereas AT-rich regions more readily open with thermal agitation, allowing the fork position to fluctuate through distant regions of the DNA sequence. In this way, sequence information both downstream and upstream of the mean fork location influences the force to progress the mean fork location through the DNA molecule. Thus, when a protein binds to DNA and modifies the accessibility of the base pairs under its footprint, that information may be captured by the unzipping fork before its mean position reaches the protein.

Theoretical unzipping curves may be generated by calculating, for a series of DNA extension values, both the force and the fork location probability density at each potential fork position (number of base pairs unzipped) in a DNA molecule. The predicted values for force and base pairs unzipped at each value of DNA extension may then obtained from the expectation values of the distributions. A tightly bound restriction enzyme may be simulated as an infinite energy barrier to fork progression at a defined base pair location, forcing the fork location probability density to zero at and beyond this point.

In the lower panels of 530 and 540, the calculated fork location probability distributions are compared both with and without a simulated bound protein that is positioned at the base pair location suggested by the high force unzipping data. For each distribution, the value of DNA extension was selected such that the resulting mean fork position was located 10 bp upstream of the simulated protein interaction. The presence of the bound protein truncates the available fork fluctuation states as the fork approaches the binding site, forcing a redistribution of probability density into the unzipping states upstream of the protein and a concurrent increase in the unzipping force. In FIG. 5 at 530, this does not occur until the fork is immediately adjacent to the protein binding site due to the limited extent of the fork fluctuations in this region. In contrast, large-amplitude fork fluctuations across the protein binding site in FIG. 5 at 540 are strongly perturbed when a protein is bound, resulting in a detectable unzipping force rise a substantial distance upstream of the protein.

The unzipping signature of a DNA-bound protein is sensitive to the DNA sequence in the vicinity of the protein binding site via the protein's ability to perturb the extent of the sequence-dependent breathing fluctuations of an approaching unzipping fork. This understanding may be used in interpreting protein unzipping data below ~20 pN to differentiate weaker protein-DNA interactions at a given sequence location from a strong barrier further downstream. Additionally, the sensitive sequence-dependence of the low-force unzipping signature can contain valuable information on the protein's location. To take advantage of this, unzipping theory curves were generated for a protein positioned at integer-base pair sequence locations in the vicinity of its apparent binding site and determined the $X^2$ value of our unzipping data against each theoretical prediction (see, for example, FIGS. 5 at 550 and 560, and FIG. 14). The minimum of the $X^2$ versus protein position plot was determined by parabolic fit, allowing us to localize a protein-DNA interaction with sub-base-pair precision, even when high-force data were unavailable.

Breathing fluctuations are an intrinsic feature of single-to-double stranded DNA fork junctions both in vitro and in vivo. Within the cell, these junctions occur at replication forks where, instead of mechanical unzipping, DNA is unwound by helicases. In this process, breathing fluctuations are believed to play an important regulatory roll by influencing helicase movement into the replication fork. Our data suggest that, additionally, thermal fork fluctuations may allow an approaching in vivo unzipping fork to detect and respond to the presence of a bound protein that is well downstream of its mean location. The sequence-dependent slowing of a replication fork approaching a bound protein could potentially facilitate early information transfer before full fork arrest occurs, e.g., by enhancing recruitment and binding of other proteins to assist in the roadblock's removal. This presents a distinct mechanism for "action at a distance," by which a protein at one location on a DNA sequence communicates information to a protein some distance away.

Using the protein unzipping behavior the interactions of bound proteins can be determined. Three type II restriction enzymes were unzipped, each with a unique binding site along a DNA sequence, from either direction (see, for example FIG. 6 and FIG. 15 including naked DNA traces) and then used the $X^2$ analysis technique to determine the locations of the interactions. While the data for the enzymes HincII (FIG. 6 at 610) and XbaI (FIG. 6 at 620) were well-described by a single strong protein-DNA interaction on either end of the protein, the data for the enzyme BsiWI (FIG. 6 at 630) were not. Although the unzipping signatures for BsiWI resemble those of the other two enzymes superficially, the unzipping behavior can be distinguished. In this case, the data are more consistent with multiple weaker interactions surrounding a central, stronger region of contact.

The footprints of all three enzymes are centered with respect to their recognition sites to within 1 bp, with sizes of 14.3±1.0 bp (HincII), 12.3±0.9 bp (XbaI), and 7.0±1.2 bp (BsiWI). This is in good general agreement with previous DNAase I and unzipping footprint measurements on restriction enzymes of the same class, which have obtained footprints ranging from 5 to 20 bp for 8 different species. Of the three unzipped enzymes, only HincII has a published crystal structure. The protein shadows the bound DNA across a region of ~50 Å or 14.8 bp, within the error of the 14.3±1.0 bp mapped by unzipping. The precision of the localization measurements is state-of-the-art; individual interactions were localized with standard deviations from 0.37 to 1.01 bp. This data shows that, rather than being hindered by image tracking, dual optical trapping measurements can be enhanced by image tracking's direct and robust measurement of extension in biological systems.

Figure 6:
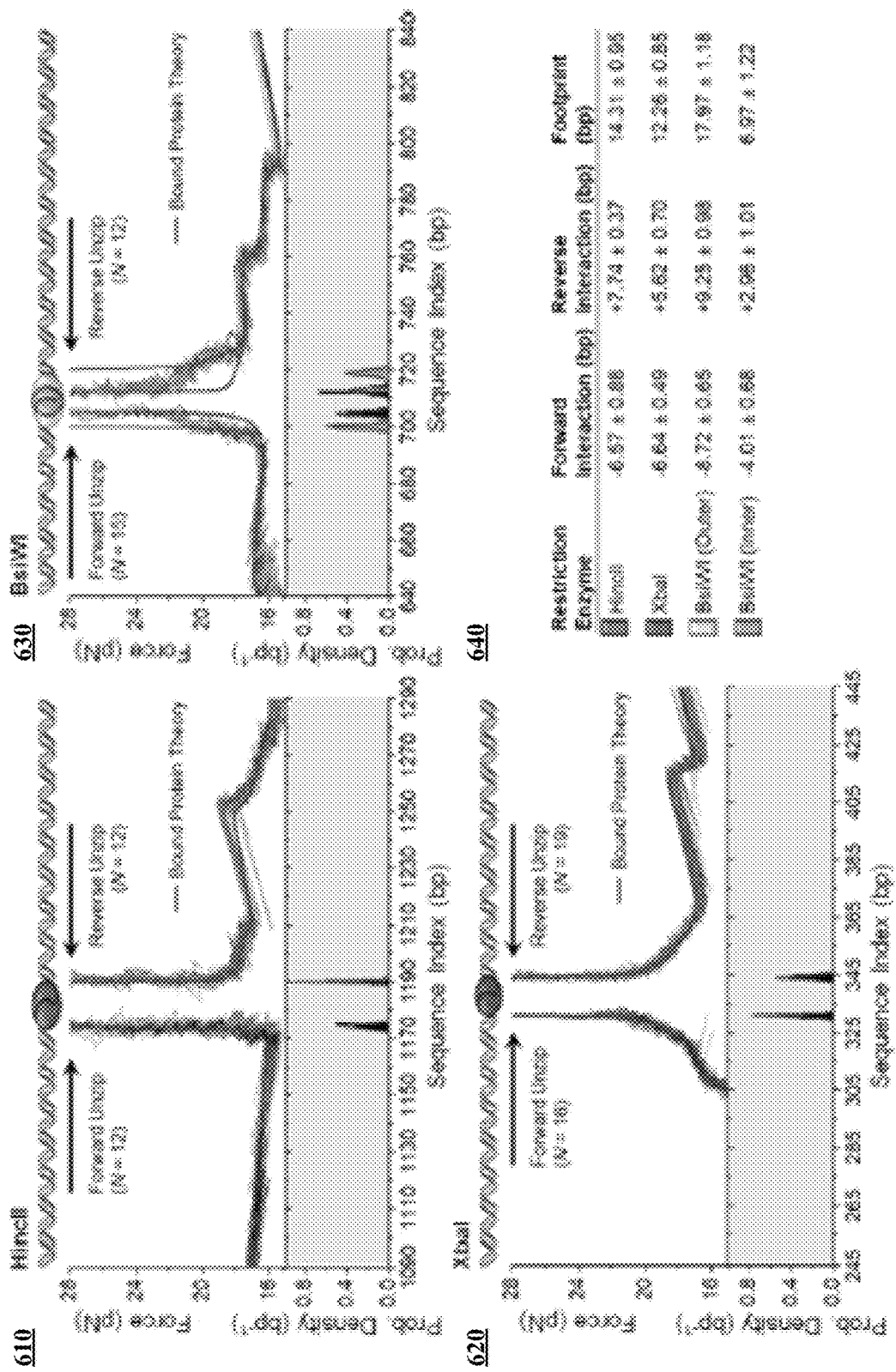
FIG. 6 depicts examples of restriction enzyme interaction mapping results, in accordance with some example embodiments.

FIG. 6. depicts an example of restriction enzyme interaction mapping results. A total of three type II restriction enzymes [(610) HincII, (620) XbaI, and (630) BsiWI] were unzipped from either direction (see, for example, FIG. 15 includes comparisons with naked DNA unzipping). For each trace (DNA molecule), we determined the most likely position of the protein using the $X^2$ technique from FIG. 5 at 530 and FIG. 14. A histogram of $X^2$ fitting results is shown below the data traces. The means and widths of the distributions were obtained using the maximum likelihood method. At 640, the means and widths for the $X^2$ fitting results of each interaction are summarized, with the forward and reverse interaction locations expressed relative to the center of the protein's recognition sequence. The precision of $X^2$ localization for individual interactions ranged from 0.37 to 1.01 bp.

The photodiode-based technique of back focal plane interferometry (BFPI) has been widely acknowledged as the only detection method suitable for attaining the highest level of optical trapping performance for biophysical studies. This has persisted in the field, even after advances in camera technology have improved the precision and speed of image tracking, due to the inability of cameras to measure the relative displacement of a bead from its trap center with the same accuracy and speed as BFPI, particularly in the important case of mobile traps.

The disclosed system provides an accurate and robust real time measure of force in an image-based optical trap and by extending this ability to mobile optical traps without sacrificing accuracy or precision. The image-based optical trapping detection system yields state-of-the-art biological data. This disclosed image tracking is able to measure extension in a dual optical trap making it superior to other detection techniques such as BFPI. See, for example, FIG. 12. The disclosed system has provided elucidation of the mechanism by which a bound protein can affect the progression of an approaching unzipping fork.

The disclosed system provides the highest levels of performance in optical trapping detection and renders image tracking for making even the most demanding dual-trapping single-molecule measurements. BFPI is very challenging to implement, e.g., with opaque substrates, and with certain hybrid instruments, in which traditional optical trapping detection cannot be used. Some limits or challenges of this detection method include the stability of the dual trap separation relative to the bandwidth and signal-to-noise ratio of the camera. As the speed and noise characteristics of imaging technologies improve at a rapid rate, image tracking may be poised to become the preferred detection method in dual optical traps.

An illustrative system including some specific elements are disclosed below. The following illustrative example is intended to show one possible system. Other specific elements and designs consistent with this patent disclosure are also possible.

An example parts list is shown in FIG. 18 at Table 1, and an example instrument layout is shown in FIG. 7. In the following, specific elements are disclosed as illustrative examples. Other devices or elements can be used in addition to, or in place of, the listed elements.

Dual optical traps may be generated from a 5W, 1064 nm fiber-coupled laser (e.g., IPG Photonics). A 60×, 1.27 NA, infrared-corrected water-immersion objective (e.g., Nikon) permits stable trapping deep within the sample chamber, facilitating DNA dumbbell tether formation and experimental flexibility. An acousto-optic deflector (AOD) (e.g., Gooch and Housego) may be used to generate time-shared dual traps from the single CW laser source. Lenses map the beam rotation at the AOD onto the back focal plane of the microscope objective and expand the beam to overfill the objective's back aperture. The AOD is driven by an RF synthesizer (e.g., Gooch and Housego), from which frequencies between 35 and 45 MHz produce a trap displacement in the sample plane of up to about 10 μm. An FPGA (e.g., National Instruments 7852R) directs the output of the RF synthesizer. This "trap control FPGA" runs on a 40 MHz internal clock, enabling flexible, deterministic timing for trap modulation and signal acquisition with a resolution of 25 ns. The traps may be modulated at 50 kHz, resulting in an "on" time for each trap of 10 μs. The diffraction efficiency of an AOD is not constant with respect to the driving frequency. To produce traps of equal and uniform stiffness across their mobile range, feedback may be performed on the trap powers (see, for example, FIG. 8). A high-speed detector measures each trap's power individually during its portion of the modulation cycle. InGaAs photodiode (e.g., Thorlabs DET20C) may be better than silicon detectors due to typical silicon detector's parasitic filtering at near-infrared wavelengths. Using the timing capabilities of the trap control FPGA, a measurement sample of the analog photodiode output is acquired during the center of each trap's on period, and then individual trap power feedback is performed on the FPGA to determine the trap output powers for the next modulation cycle.

To generate images for bead position detection, a high-speed CMOS camera (e.g., Mikrotron CAMMC1362) may be used. A high-powered LED (e.g., Thorlabs) emitting at 445 nm may be used to illuminate the microscope sample from above. The LED provides up to 5.4 W of power, allowing high-contrast and low-noise images even at 10,000 frames per second (fps) (see, for example, FIG. 9). The illumination is focused onto the sample plane from a diameter of about 3 cm down to about 0.5 cm. Many instruments employ collimated illumination to produce an extended pattern of diffraction fringes around the beads being tracked, which aids in tracking beads along the "z" axis perpendicular to the sample plane. Because bead motion along this perpendicular axis is not important to the measurements, focused illumination aids the tracking precision (by allowing us to maximize the contrast in our images to the camera's dynamic range with less input light) and the tracking speed (by reducing the useful tracking region to the bead's central bright spot and first surrounding dark ring). Tracking simulations were performed to confirm that lower contrast diffraction rings do not contribute significantly to lateral tracking precision.

A low-powered LED operating at 630 nm also illuminates the sample from above for wide-field-of-view imaging at 30 fps by an additional camera (e.g., Andor), which may be a high-sensitivity camera that can also be used to acquire fluorescent images. This second camera primarily aids in tether formation and sample chamber navigation, and any basic camera will suffice in this role. The two imaging wavelengths are combined for illumination using a dichroic mirror (e.g., Thorlabs). A second dichroic mirror (e.g., Chroma, 5 mm thick) below the objective transmits the trapping laser, and reflects visible wavelengths toward our imaging apparatus. The visible light is collected by a tube lens (e.g., Thorlabs), and then directed to their respective cameras by a third dichroic (e.g., Chroma). A 4× optical magnification attachment (e.g., Nikon) on the Mikrotron camera provides additional image enlargement. The conversion from camera pixels to nanometers in the sample plane is determined using a calibration grid printed on a microscope slide (e.g., Thorlabs), from which we obtained a value of 57.3 nm per pixel (0.01745±0.00001 pixels per nm) using a cross-correlation-based analysis of the grid images.

FPGA Image Tracking.

Image tracking may be performed on a second "image-tracking FPGA" (e.g., National Instruments 1473R). The high-speed camera is connected to the FPGA via Camera-Link in the base configuration. Pixels from a cropped region of interest (ROI) 200×7 pixels in size are sent in single tap, 10-bit mode on the camera's 80 MHz clock. On the image tracking FPGA, three parallel, independent loops perform image acquisition and preprocessing, bead position tracking, and transfer of the tracked bead positions, respectively (FIG. 2A). In the acquisition loop, pixels are read out one at a time and processed as they arrive. Sequential processing steps are pipelined to allow for full parallelism; once a pixel leaves an individual processing step to the next downstream function, a new pixel is clocked in so that all functions are acting on a different pixel simultaneously.

Pixel preprocessing begins by applying a correction for the camera sensor's fixed pattern pixel noise by subtracting a constant offset for each pixel. The appropriate offset for each pixel is determined before an experiment by averaging 1000 image frames and calculating each pixel's difference from the mean frame intensity, and then sent and stored in the FPGA's block memory. Next, the pixel stream is routed to one of two memory queues, one for each bead's pre-defined sub-ROI within the full image ROI. As the pixels for a given frame are being sorted into memory, the FPGA determines the positions of the brightest pixel within each bead's sub-ROI. This will provide a coarse estimate of the bead centers about which the tracking algorithm can later focus. On the last pixel of an image frame, these starting positions are passed to the FPGA tracking loop running on a 40 MHz clock.

The tracking loop is triggered to begin once it receives the results from the acquisition loop. Pixels are read out of their respective queues for each bead sequentially. The tracking loop first constructs a line profile centered around the starting position identified in the acquisition loop. The size of the line profile may be varied, but for this work, we used a line profile 15 pixels in length, summing across three pixels in the orthogonal direction to reduce noise. The line profile is zeroed by subtracting the value of the first element of the array from all array elements. Informed by tracking simulations, the line profile size and baseline subtraction methods were chosen to minimize tracking bias and maximize precision. The zeroed line profile may be cross-correlated with its mirror image to generate a one-dimensional cross-correlation array, the peak of which can be mapped back to the original pixel space, giving the computed location of the bead. The sub-pixel maximum of the cross-correlation array is found by performing a parabolic least-squares fit to the array maximum and its single nearest neighbor to either side. Some FPGAs are not well-suited to nonlinear curve fitting; however, the task is greatly simplified in this case by the fact that the Vandermonde matrix, and its transpose are fixed and can be calculated in advance. For a least squares fit about the cross-correlation array peak value Ri and its nearest neighbors Ri−1 and Ri+1, the maximum of the resulting curve fit reduces to the following "three point estimator":

$$R_{max} = \frac{3R_{i-1} - 4R_i + R_{i+1}}{2R_{i-1} - 4R_i + 2R_{i+1}} \quad \text{Equation 1}$$

Because multiply and divide operations performed on an FPGA require specialized hardware multipliers of which an FPGA typically has just a few dozen, the ability to simplify a curve fitting process involving matrix calculations and determinants to a single, simple arithmetic expression is crucially important for the viability of performing this image processing algorithm on an FPGA.

The pixel locations of each bead determined in the tracking loop are passed to the data transfer loop, which sends these values to the trap control FPGA. The two FPGAs are connected via a dedicated input/output (I/O) extension board (National Instruments), which equips the image tracking FPGA with eight configurable digital input/output (DIO) lines, which we wired to eight of the DIO lines on the trap control FPGA. The image tracking FPGA connects to the I/O extension board directly via a ribbon cable; signals are not routed through the computer's PCIe bus. The tracked pixel locations of the two beads are stored in a 30-bit fixed point data type yielding a discretization of $2.38 \times 10^{-7}$ pixels or $1.37 \times 10^{-5}$ nm, which are here encoded in a length-30 Boolean array suitable for digital TTL transfer. We use one DIO line to signal the trap FPGA that data are ready for transfer, a second to clock the data transfer at 10 MHz, and the remaining 6 DIO lines to transfer the 30-bit bead positions over 5 clock cycles. The full transfer of one bead position data point takes 800 nanoseconds. The data are read by the trap control FPGA and translated back into a numeric form, at which point the current AOD frequency of the active trap is used to index the trap separation LUT for calculating $\Delta_{X_{bead}}$. The latency of bead tracking is thus a critical parameter for this technique; the bead separation data lags the trap separation data by the tracking latency time, and this introduces systematic force errors when the traps are in motion. Because our tracking is implemented on an FPGA, the total latency between the finished camera exposure and the completed transfer of the tracked bead positions is around 50 μs, yielding errors less than an Angstrom in $\Delta_{X_{bead}}$ for active trap speeds up to 400 nm/s.

Free Bead-Separation Calibration and $\Delta_{X_{bead}}$ Determination

To calibrate the free bead separation, we start with an untethered bead in each trap. The stationary trap remains fixed at 35 MHz and the active trap is stepped from 37 to 45 MHz across 330 intervals spaced evenly in frequency as the bead separation is measured. The spacing of the trap separation LUT, resulting in one data point approximately every 22 nm of trap movement, was determined empirically to minimize the variance of the resulting $\Delta_{X_{bead}}$ measurement. At each LUT position, 50 unique points of trap separation values from the 1 kHz filtered data acquisition buffer are sampled and averaged together. The resulting array of trap separations is transferred to the trap control FPGA and stored in block memory. The full calibration process takes about 30 s. During an experiment, upon arrival at the trap control FPGA of the tracked bead positions from the image tracking FPGA, the bead-to-bead separation is calculated and the current position of the active trap is used to index the trap separation LUT with linear interpolation. During our unzipping experiments, a new LUT was obtained at the start of each data acquisition session immediately prior to data collection and at the same trap power with which the unzipping data would be obtained. LUTs were updated periodically during experimental data collection, approximately every 10 to 30 min. The calibration LUT and its stability are examined further in FIG. 11.

Stretching and Unzipping

The generation of stretching and unzipping templates has been described previously. The DNA sequences for the HincII, XbaI, and BsiWI binding sites and the surrounding 200 bp (100 bp in the up- and downstream directions) are provided in FIG. 19 at Table 2. The designation of a "forward" and "reverse" direction for unzipping templates is ultimately arbitrary but is consistent with the 5' to 3' direction of the sequences listed in this table. For forming DNA dumbbell tethers, carboxylated beads (Polysciences) were coated with (either) streptavidin and antidigoxigenin in house. The process of forming a DNA dumbbell tether is described in detail in FIG. 16.

For FIG. 4, our template for both stretching and unzipping consisted of 6644 bp of double-stranded DNA "arms" and an 832 bp unzipping "trunk". Experiments were performed in phosphate buffered saline (10 mM Na2HPO4, 1.8 mM KH2PO4, pH 7.4, 137 mM NaCl, and 2.7 mM KCl). In FIG. 4a, the beads were 500 nm in diameter, and the trap stiffness was constant at ~0.28 pN/nm. The active trap was moved away from the stationary trap to stretch the DNA arms at a constant velocity of ~200 nm/s. Data traces were truncated at a force of 12 pN prior to the onset of unzipping. In FIG. 4b, the beads were 800 nm in diameter, and the trap stiffness was constant at ~0.36 pN/nm. Unzipping was performed using a constant active trap velocity of 20 nm/s, and rezipping was performed using a constant active trap velocity of −40 nm/s.

Protein unzipping experiments for data shown in FIGS. 5 and 6, and FIGS. 13-15, and all related calibration experiments were performed in a buffer containing 50 mM Tris-HCL pH 7.9, 100 mM NaCl, and 1 mM CaCl2. Unzipping templates consisted of 6644 bp of double-stranded DNA arms and unzipping trunks of various lengths between 0.7 and 4.4 kbp. All experiments were performed under conditions of constant trap stiffness (ranging from 0.27 to 0.38 pN/nm) and constant active trap velocity (ranging from 40 to 100 nm/s). Proteins were purchased from New England Biolabs. One microliter of stock protein corresponding to 10 (HincII, BsiWI) or 20 (XbaI) vendor-calibrated units was added to a 15 μL pre-incubation of DNA and beads just prior to introduction into the experimental flow cell for tether formation. Additionally, protein was included in the unzipping buffer in which unzipping experiments were performed, at concentrations ranging from ~100 units per milliliter (1:100 dilution) to ~700 units per milliliter (1:15 dilution)

While force in an optical trap is generally treated as being linearly proportional to bead displacement, the validity of this approximation decreases with increasing distance from the trap center. To improve data accuracy throughout the wide range of forces encountered during protein unzipping experiments, we developed a technique (FIG. 17) to measure the non-uniformity of trap stiffness as a function of bead displacement. This calibration, performed once, is used to convert all measured bead displacements into forces in later experiments. The technique utilizes the knowledge that, in our constant trap velocity unzipping experiments, a DNA molecule will unzip at the same force regardless of the nature of the trapping potential.

Accordingly, we unzipped DNA molecules multiple times at laser-trapping powers ranging from 120 to 300 mW in the sample plane, resulting in average bead displacements during unzipping of 117 to 33 nm. From our theoretical model of unzipping we obtained the predicted unzipping force and plotted this force per watt of trapping power versus the measured bead displacement at each power. The resulting data was well-fit by the derivative of a Gaussian (DoG) function. This function and the obtained fit parameters were subsequently used to convert measured bead displacements into values of force. For protein unzipping data only, we allowed the amplitude of the DoG function to be a free parameter to correct for small observed variations in unzipping force (typically 1 to 3%) between traces, which could be due, e.g., to variations in bead sizes or drift of the trapping power in the sample plane. The unzipping force calculated by our theoretical model was used to determine the appropriate DoG amplitude for the conversion of each trace.

The thusly determined values of force and extension during unzipping were converted to the number of bases unzipped in the sequence using a modified Marko-Siggia model21 for double stranded DNA (dsDNA), and the freely jointed chain model41 for single-stranded DNA (ssDNA). DNA elasticity parameters may be obtained by fitting double and single-stranded DNA stretching data with their respective models. For this work, we performed this calibration for ssDNA and used previous calibration results21 for dsDNA (persistence length of 42 nm, elastic modulus of 1200 pN, and contour length per base of 0.338 nm, also used for stretching theory curve in FIG. 4a). To stretch single-stranded DNA, a hairpin was placed at the end of an unzipping segment, and the construct was unzipped to completion and then stretched. From the resulting values of extension, the contribution of the double-stranded portion of the unzipping construct was subtracted, leaving the force-extension relationship of only the single-stranded portion for fitting. Fitting resulted in an ssDNA persistence length of 0.71 nm (half the Kuhn length), elastic modulus of 420 pN, and counter length per base of 0.52 nm. Once represented as force versus the number of base pairs unzipped, individual protein-unzipping traces were aligned horizontally to the DNA baseline theory using small global shift and stretch adjustments (typically <10 nm and <1%, respectively) determined by a simplex algorithm.

Around the approximate apparent protein position as indicated by the location of the vertical force rise asymptote, we generated theory curves for proteins located at integer-spaced base-pair locations along the template. The theory assumes an infinite energy barrier at the specified point along the sequence, such that the unzipping fork cannot progress further. For each generated theory curve, we computed the X2 value comparing our measured base pairs unzipped to the theoretical base pairs unzipped, using DNA extension as the common independent variable. To determine protein location with sub-base-pair precision, we plot the resulting X2 versus theoretical protein position and fit the minimum point plus its nearest neighbor to either side with a parabola.

The footprints for HincII and XbaI were determined using X2 fitting on the full unzipping signature from the onset of the deviation from the naked DNA theory to a force of 26 pN. To analyze the BsiWI footprint, we performed X2 fitting on cropped regions of the protein unzipping signature, from the onset of the force deviation from the naked DNA to a force of 20 pN for the outer interaction, and from 23 to 26 pN for the inner interaction.

One or more analysis steps may be performed with a custom LabVIEW 2015 program, and/or other executable instructions.

In the foregoing, figures are shown and text describes an example system layout, trap power measurement and feedback, image tracking benchmarks, Allan deviation characterizations of instrument performance, bead separation calibration stability, accuracy in length determination, HincII unzipping controls, determination of protein position by X2 analysis, naked DNA unzipping traces, a bi-directional flow cell, and nonlinear trap stiffness calibrations; tables showing a part list and DNA sequences; a proof regarding force in a dual optical trap.

FIG. 7 depicts an example of a system layout. An example parts list for the system layout of FIG. 7 is provided in FIG. 18 at Table 1. The following specific elements and components are for illustrative purposes. Other elements or components can be used in addition to, or in place of, those listed. Upon exiting its fiber output, the 1064-nm trapping laser first has its polarization rotated by a half-lambda wave plate and polarizing beam splitting cube, in order to accommodate the requirements of the AOD. After the AOD, the deflected 1st order beam passes through two Keplerian telescopes, which provide a combination of beam expansion (of 5.5× to a final waist of 10 mm) and mapping of the AOD rotation plane onto the back focal plane of the objective. The dashed line indicates the locations of these conjugate planes. A periscope is used to direct the laser into the vertically-oriented microscope objective and aid in alignment. A 5-mm thick dichroic passes the trapping laser through to the objective, and reflects visible wavelengths for imaging. The portion of the trapping laser that reflects off the back surface of this dichroic is focused onto the surface of a high speed photodiode (HSPD) for power measurements and feedback. Imaging is performed simultaneously on a high-speed CMOS camera (HSCAM) illuminated by a high-powered LED at 445 nm, and a wide field of view EMCCD camera (EMCCD) illuminated by a low-powered LED at 630 nm. The illumination is focused into a spot size of about half a centimeter near the sample plane. Samples are mounted atop a pair of stages, one piezo-actuated for fine motion, and a second motorized for coarse motion.

Figure 8:
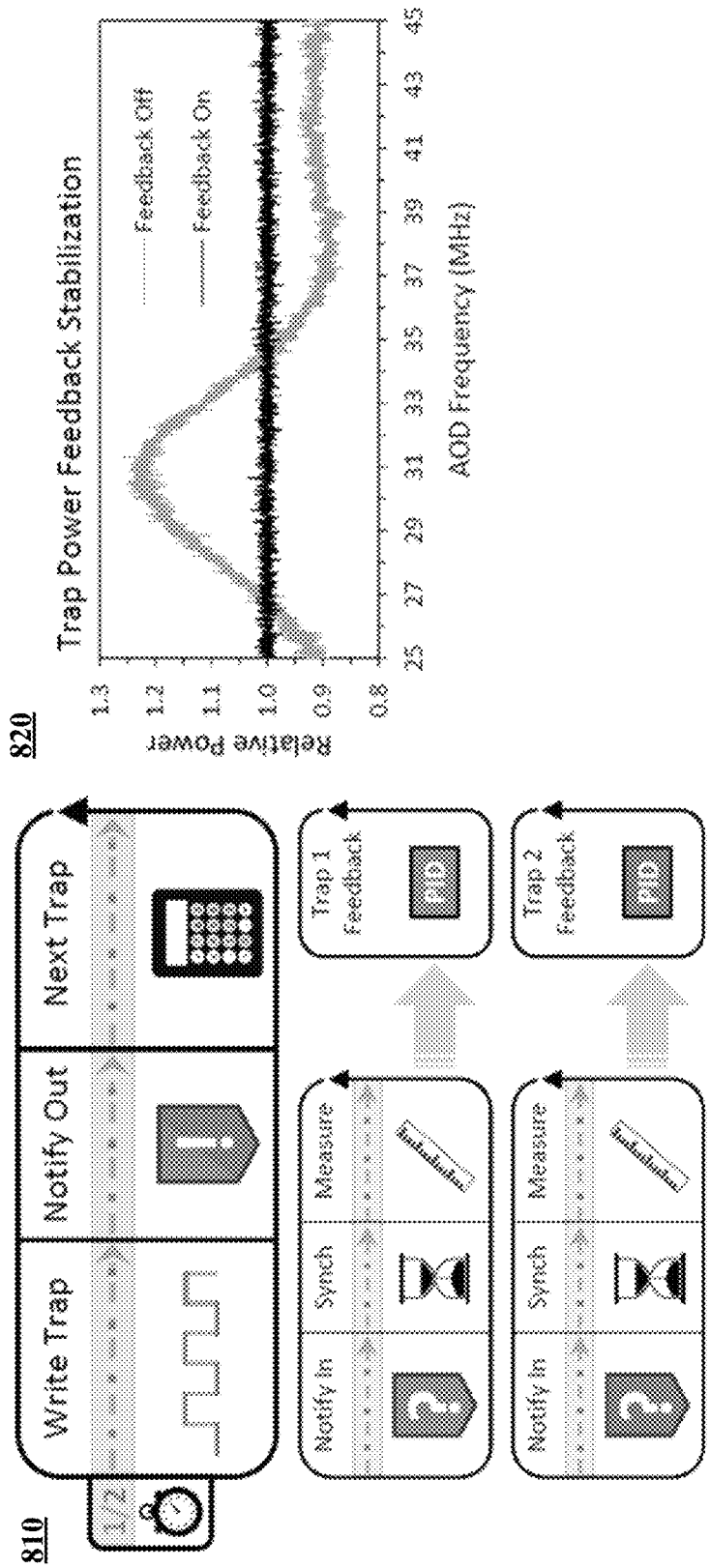
FIG. 8 depicts an example of FPGA-synchronized power measurement and feedback, in accordance with some example embodiments.

FIGS. 8 at 810 and 820 depict an FPGA-synchronized power measurement and feedback system. At 810, a schematic of the FPGA structure for measuring trap powers and performing feedback. The trap powers need to be measured for each trap individually while the traps are being modulated at 50 kHz, necessitating a high-speed detector and precise measurement timing. Additionally, a phase lag exists between the trap control output signal and the actual trap response, therefore careful synchronization should be performed. The trap outputs (which designate their powers and positions in the sample plane) are written in the upper loop, which executes for each trap sequentially. The timing of the loop thus determines each trap's "on" period. Trap power measurement and feedback occur for each trap in its own separate, parallel loop. After a trap output is written in the main loop, a notification is sent to the appropriate power measurement loop depending on which trap was just written. The loop then progresses to a waiting stage, in order to account for the phase lag of the generated trapping signal and the trap's own period length, and then acquires a single sample in the center of the trap's "on" period. The result of PID feedback is transferred back to the upper loop and will take effect the next time that trap's output is written. At 820, without feedback, trap power is observed to vary with the AOD's driving frequency (and thus with trap position in the sample plane). Feedback results in traps of uniform stiffness across their full movement range.

Figure 9:
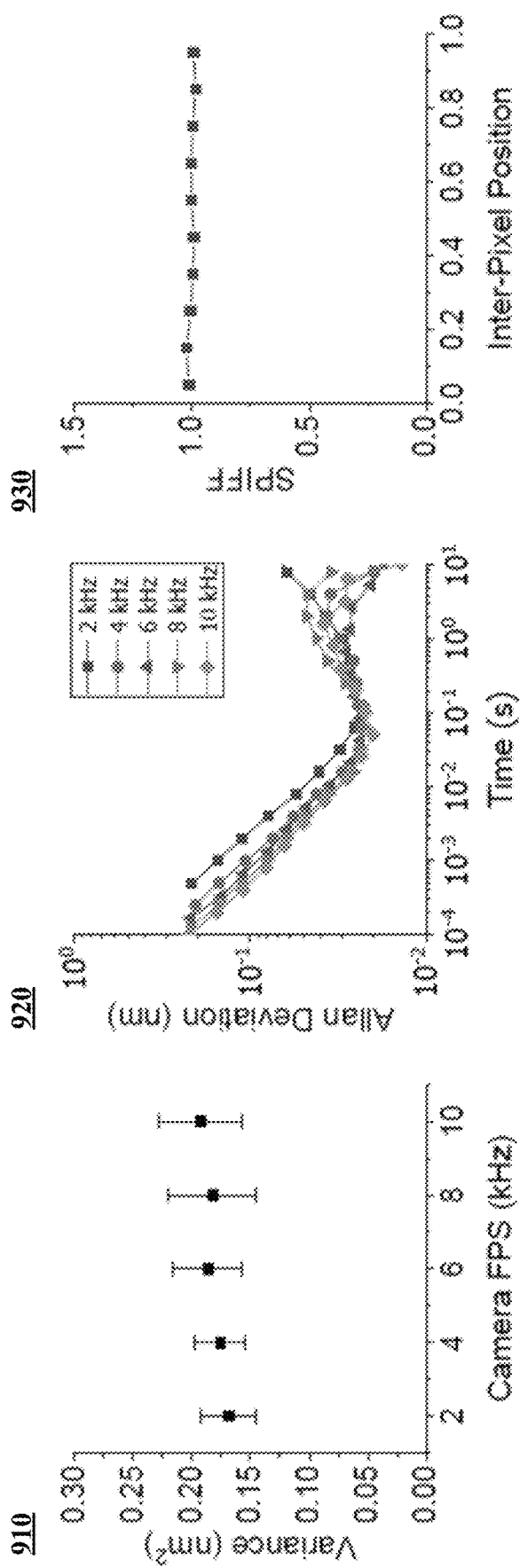
FIG. 9 depicts examples of image tracking benchmarks, in accordance with some example embodiments.

FIG. 9 depicts some examples of Image tracking benchmarks. At 910, a graph showing positional variance of an 800-nm bead stuck firmly to a microscope coverslip as determined by image tracking at different acquisition rates. The contribution of drift to the variance was determined via a progressive high-pass filtering technique and subtracted. Though a minute increase in variance with increasing framerate is observed, overall the application is not light-limited. At 910, shown are Allan deviations of the separation between two 800-nm beads stuck firmly to a microscope coverslip as determined by image tracking at different acquisition rates. Here, using the separation between two beads rather than the absolute position helps reduce drift in order to reveal the basic performance of the tracking system. The tracking exhibits the expected deeply sub-nm precision. Higher camera frame rates can potentially enhance the precision of the separation measurement for a given time window by providing more data points for averaging, however deteriorating signal-to-noise ratios at the shorter exposure times for higher data acquisition rates will outweigh this gain if the application is light-limited. Here we see the best possible precision is obtained with 10 kHz acquisition rates at an averaging time of about 0.1 seconds, however the reachable precision is comparable for acquisition rates between 4 and 10 kHz. At 930, the single-pixel interior filling function (SPIFF) was calculated for our tracking algorithm. The SPIFF is a histogram of the sub-pixel positions returned from a particle tracking operation, and should be uniform in the complete absence of algorithm-induced tracking bias. It represents a sensitive and assumption-free measure of tracking bias. The data set used to compute the SPIFF was obtained by tracking bead separation at 10 kHz as the active trap was scanned at ~20 nm/s across its full mobile range corresponding to about 7200 nm, or 125 pixels. The integer portion of the tracked bead separations were discarded, and the remaining decimal values representing the tracked sub-pixel positions across all 125 pixels were compiled into a histogram. The histogram counts were normalized by the average count of all bins to better show relative fluctuations across a pixel. The tracking results are nearly ideal, exhibiting very minor fluctuations on the order of 1%.

Figure 10:
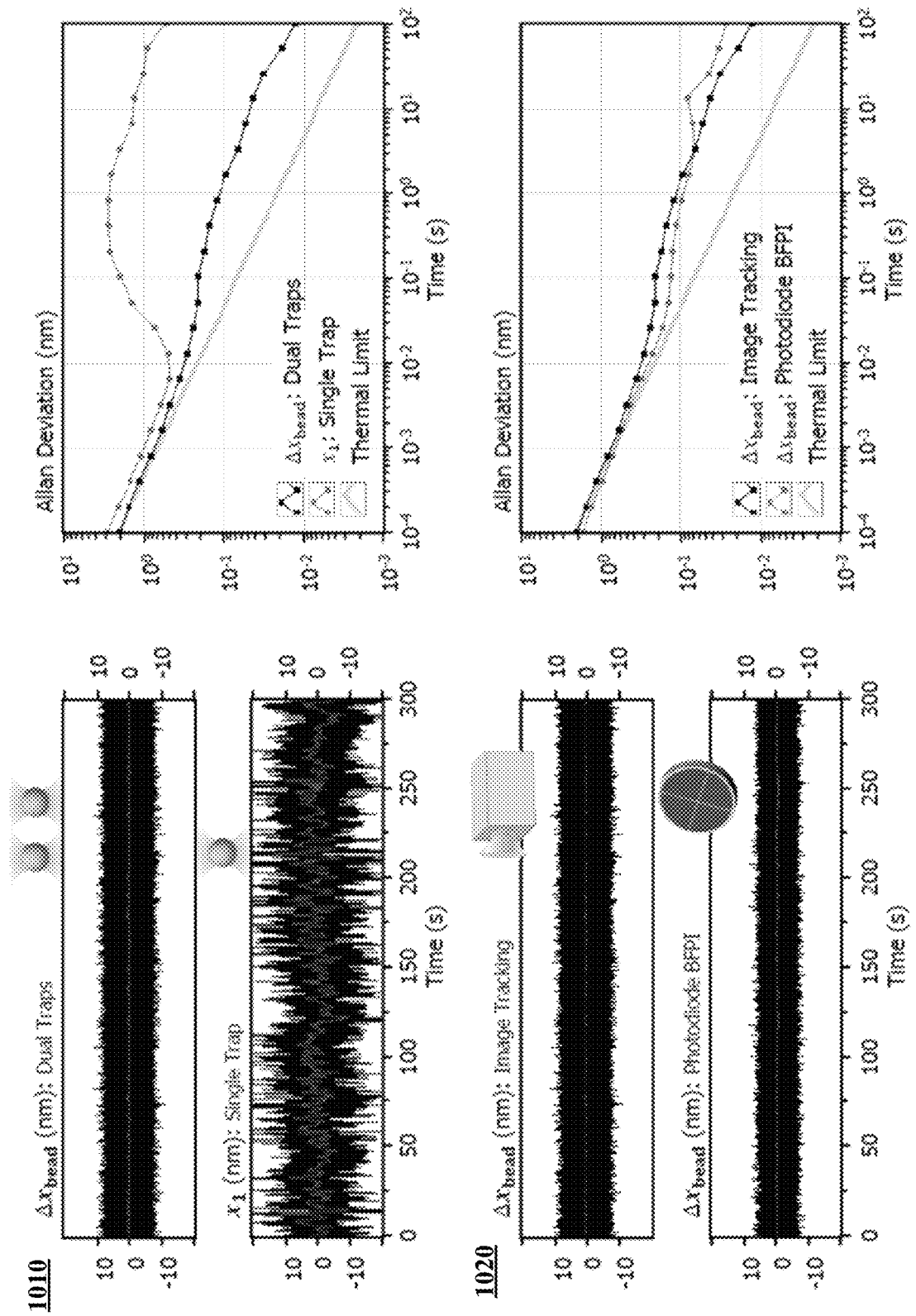
FIG. 10 depicts examples of Allan deviation comparisons, in accordance with some example embodiments.

FIG. 10 depicts examples of Allan deviation comparisons. At 1010, the Allan deviation (ADEV) of $\Delta_{X_{bead}}$ for a stationary bead pair is compared to the ADEV of a single bead's absolute position, with a trap stiffness of 0.3 pN/nm and an acquisition rate of 10 kHz in both cases. The high trap stiffness limits the extent of Brownian fluctuations, so that other noise in the system can become more apparent. The thermal limit represents the ADEV of Brownian fluctuations for a bead in an ideally stationary trap at the same trapping stiffness, thus an increase in the measured ADEV above the thermal limit reflects the contributions of additional instabilities and noise sources. The single bead position reflects the presence of significant laser pointing fluctuations and drift, with an amplitude on the order of 20 nm. These factors result in over an order of magnitude increase in the single-bead ADEV. A calibration of single trap position cannot assume an instantaneous accuracy better than this limit. At 1020, the ADEV of $\Delta_{X_{bead}}$ for two stationary beads in our image tracking setup is compared to the ADEV of $\Delta_{X_{bead}}$ for two stationary beads in a separate, photodiode-based dual optical trap which measures the displacement of each trapped bead via back-focal-plane interferometry (BFPI). The dual optical traps are generated in the second case by splitting a trapping laser into two independent traps via polarization. The traps were maintained at a stiffness of 0.3 pN/nm and the data was acquired at 10 kHz in each case. To mirror the effects of camera tracking, photodiode data was integrated between samples. The instruments perform similarly, with BFPI exhibiting slightly better high-frequency performance as expected due to the high signal-to-noise ratio provided by the intense trapping laser. Over long time scales, the increase in stability of the timeshared traps as compared to the polarization-based traps overcomes the initial performance deficit and exhibits improved precision.

FIG. 11 depicts an example of bead separation calibration LUT stability. At 1110 is a graph of data taken over the course of about one hour, 29 bead separation calibration look-up-tables are shown. Each LUT was obtained with a different bead pair. Details of how LUTs are obtained are described in the methods section. For this data, the averaging time per LUT point was 50 ms from an initial data acquisition rate of 10 kHz, which affects the initial accuracy of the LUT as informed by the Allan Deviation of bead separation measurements. Thus the initial LUT accuracy could be readily improved with longer integration times. At 1120, an chosen line (m=9.04325×10-5 nm/Hz, b=−549.031 px) was subtracted from all calibration LUTs to better display fine details in the data. LUTs obtained at roughly 20-minute intervals were selected to more clearly illustrate the time-evolution of the data. A trap 2 position of 40 MHz represents just over 4 □m of DNA extension between the two beads, and encompasses all biological data presented in this manuscript. For trap 2 positions between 37 and 40 MHz, the LUTs exhibit tight grouping over the full hour. For larger trap separations, the bead separations are observed to drift more than 1 nm over the course of an hour. At 1130, at each LUT frequency, the bead separation is plotted in nanometers vs elapsed time in minutes for the 29 LUTs and fit the data to a line to approximate the drift rate via the linear fit slope. Data is shown with sliding window smoothing to approximately 0.5 MHz. The drift rate in the region in which our experiments were performed (trap 2 between 37 and 40 MHz) is approximately 0.01 nm per minute.

Figure 12:
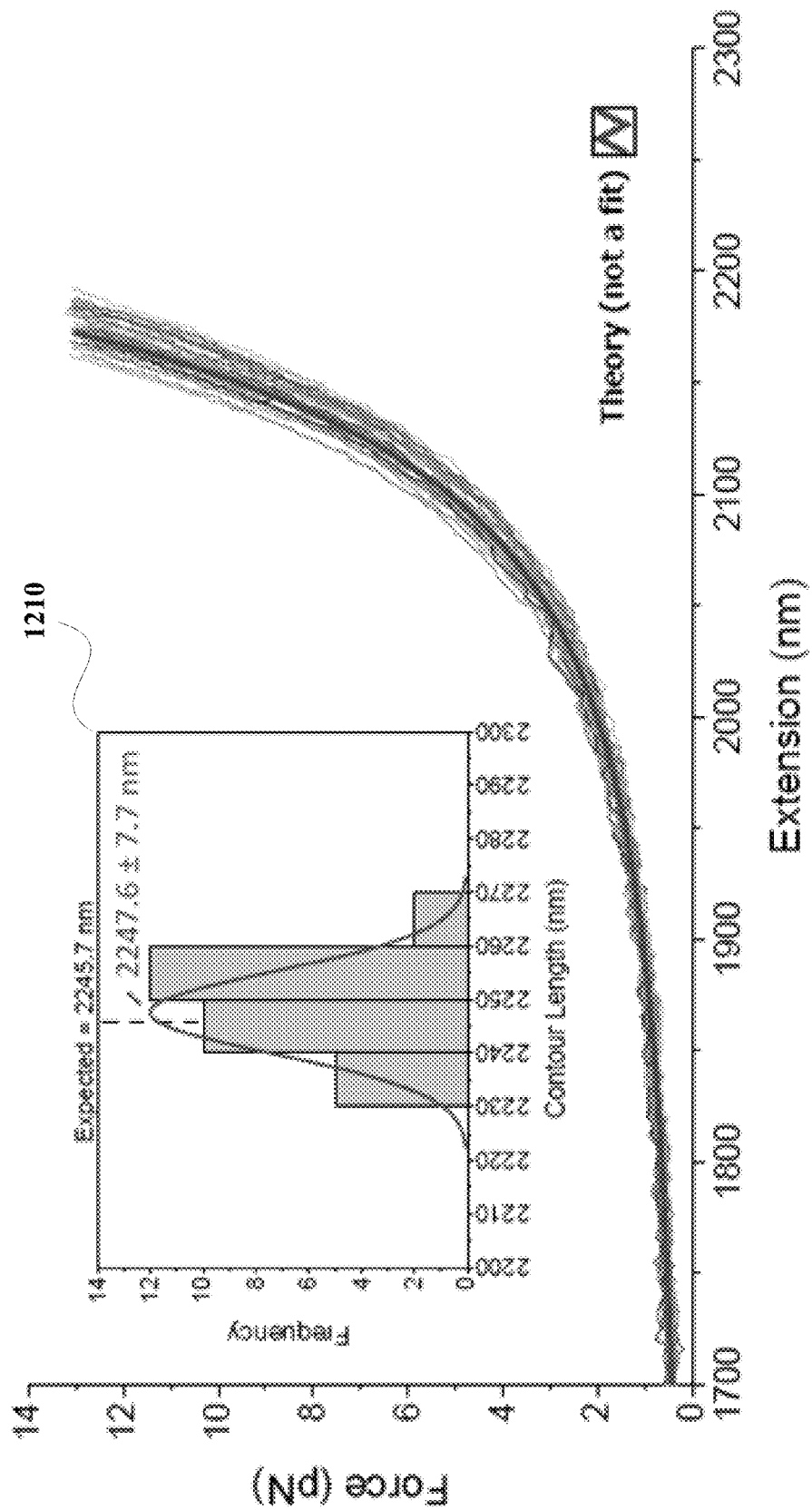
FIG. 12 depicts an example of accuracy in absolute length determination, in accordance with some example embodiments.

FIG. 12 depicts an example of accuracy in length determination. Twenty-none traces were obtained from stretching double-stranded DNA 6644 base pairs in length. The overlaid theory is for a dsDNA molecule with a persistence length of 42 nm, an elastic modulus of 1200 pN, and a contour length per base pair of 0.338 nm. The data were acquired at 8 kHz and filtered to 100 Hz in order to more easily visualize the individual traces within the group. Data are truncated at 13 pN. From the measured values of dual bead separation, a fixed value of 505 nm can be subtracted which accounts for the manufacturer-specified diameter of the carboxylated beads before protein coating (Polysciences, 489 nm), the protein coating (estimated 5 nm for streptavidin, 7 nm for anti-digoxigenin), and the carbon linker lengths of the biotin-14-dATP and digoxigenin-11-dUTP (Sigma-Aldrich) labels on the DNA (estimated ~2 nm each). The raw data were not aligned or otherwise processed in any way.

At the inset at 1210, each trace was fit with a modified Marko-Siggia model5 to extract the DNA molecule's contour length. The distribution of determined lengths yielded a mean tether length of 2247.6±7.7 nm, which compares remarkably well to the expected length of 2245.7 nm given a dsDNA length of 0.338 nm per base pair. The width of the distribution at 7.7 nm is significantly smaller than the bead size uncertainty specified by the manufacturer (3% or 14.7 nm), however this is likely a "worst case" specification. The data suggest that the spread in the distribution of measured tether lengths may be due predominately to variations in bead size, with minimal contributions from instrument drift. This level of accuracy in the determination of absolute length measurements by image tracking is not shared by photodiode-based instruments.

Figure 13:
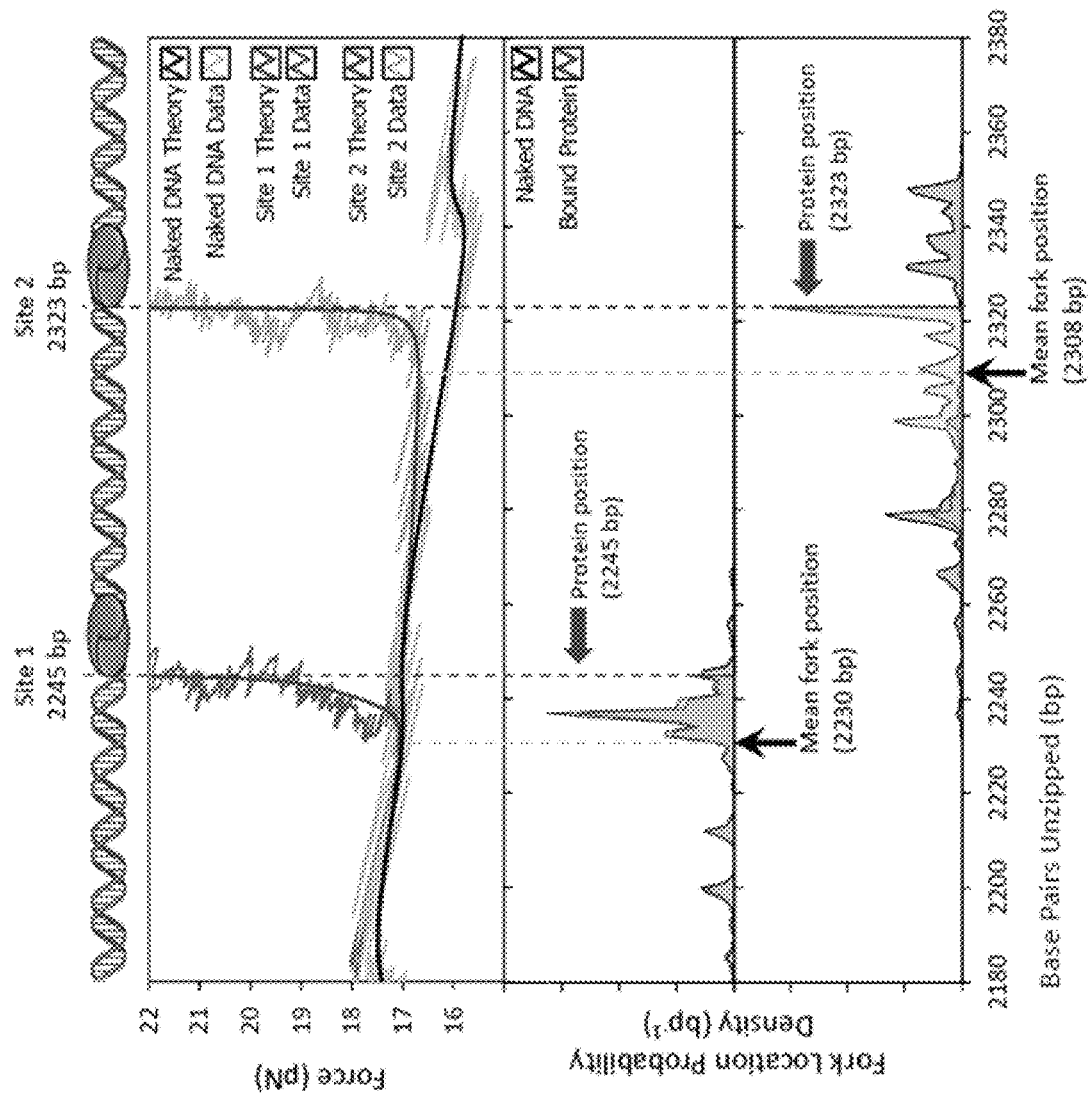
FIG. 13 depicts an example of HincII unzipping on a single template, in accordance with some example embodiments.

FIG. 13 depicts an example of HincII unzipping on a single template. To control for the effects of differing DNA sequences far upstream of the protein binding sites on the observed protein unzipping behavior, we unzipped a DNA template in which the restriction enzyme HincII had two neighboring binding sites centered 2252 base pairs and 2330 base pairs into the sequence. Thus the sequences preceding the first and second binding sites were identical outside of 78 additional base pairs upstream of binding site 2, which provided a different local sequence context from binding site 1.

The unzipping data for naked DNA and for a protein bound at each site are shown in the top panel along with theoretical predictions. The protein location for the protein theory calculations was selected to be 7 bp upstream of the center of the protein's recognition sequence, as informed by the HincII footprint measurements from FIG. 6. The unzipping signatures for HincII at sites 1 and 2 show distinct behaviors with respect to the distance from the protein location at which the unzipping behavior first deviates from the underlying naked DNA baseline.

Below the unzipping data we show, for each binding site, the fork location probability distributions with and without a bound protein when the mean fork position is 15 bp upstream of the assumed location of the protein-DNA interaction.

At the first binding site, the width of the fluctuations observed in the naked DNA are narrow, and the fraction of the fork's location probability density extending past the would-be protein site is low. Thus the presence of the protein represents a relatively minor perturbation to the fork's explorable landscape when the fork is 15 bp upstream.

Upstream of the second binding site, however, the naked DNA exhibits wide-scale fluctuations, predominately between two regions located around 2280 and 2340 base pairs. These fluctuations are visible in the unzipping data as the fork hops back and forth between these two regions of elevated probability density. In this case, the binding of the protein 15 base pairs downstream of the mean fork position drastically alters the fork's probability density distribution, resulting in a clearly distinguishable force deviation from the naked DNA baseline.

Figure 14:
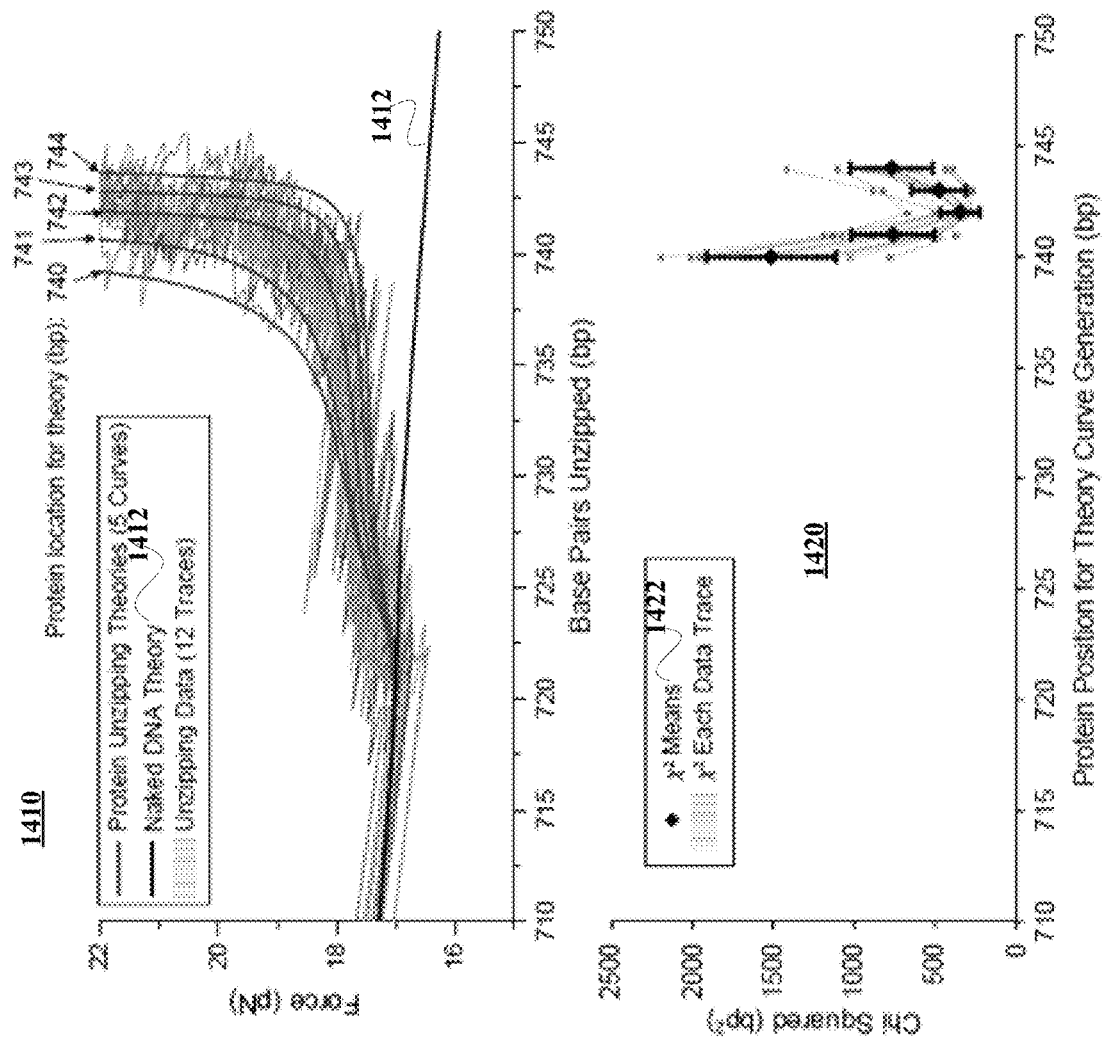
FIG. 14 depicts an example of determining protein position by X2 analysis, in accordance with some example embodiments.

FIG. 14 depicts an example of determining protein position by $X^2$ analysis. At 1410, to determine the most likely position of a bound protein from a collection of protein unzipping traces, a series of protein unzipping theory curves (740-744) are generated. Each curve is generated by placing an infinite energy barrier at the specified sequence location, which truncates the fork location probability distribution and prevents the fork from progressing past this point in the sequence. Here we show 5 theory curves for a simulated protein bound at positions 740 through 744 bp, overlaid on top of our unzipping data traces. The naked DNA unzipping theory (1412) is also included for comparison. At 1420, for each unzipping data trace, we compute the Chi Squared ($X^2$) value for the data against the theoretical models generated at each protein location. The results for each individual trace are represented by the lines in 1410 other than 740-744. The mean $X^2$ value at each protein location is displayed in 1422 with error bars representing the standard deviation. We performed a 3-point parabolic fit around the minimum of each trace's $X^2$ results to extract its minimum location on the template. The final protein position is determined from the fitting results of all traces using the maximum likelihood method. To calculate $X^2$ between our unzipping data and the theoretical predictions, we use extension as the common independent variable, and base pairs unzipped as the dependent variable.

Figure 15:
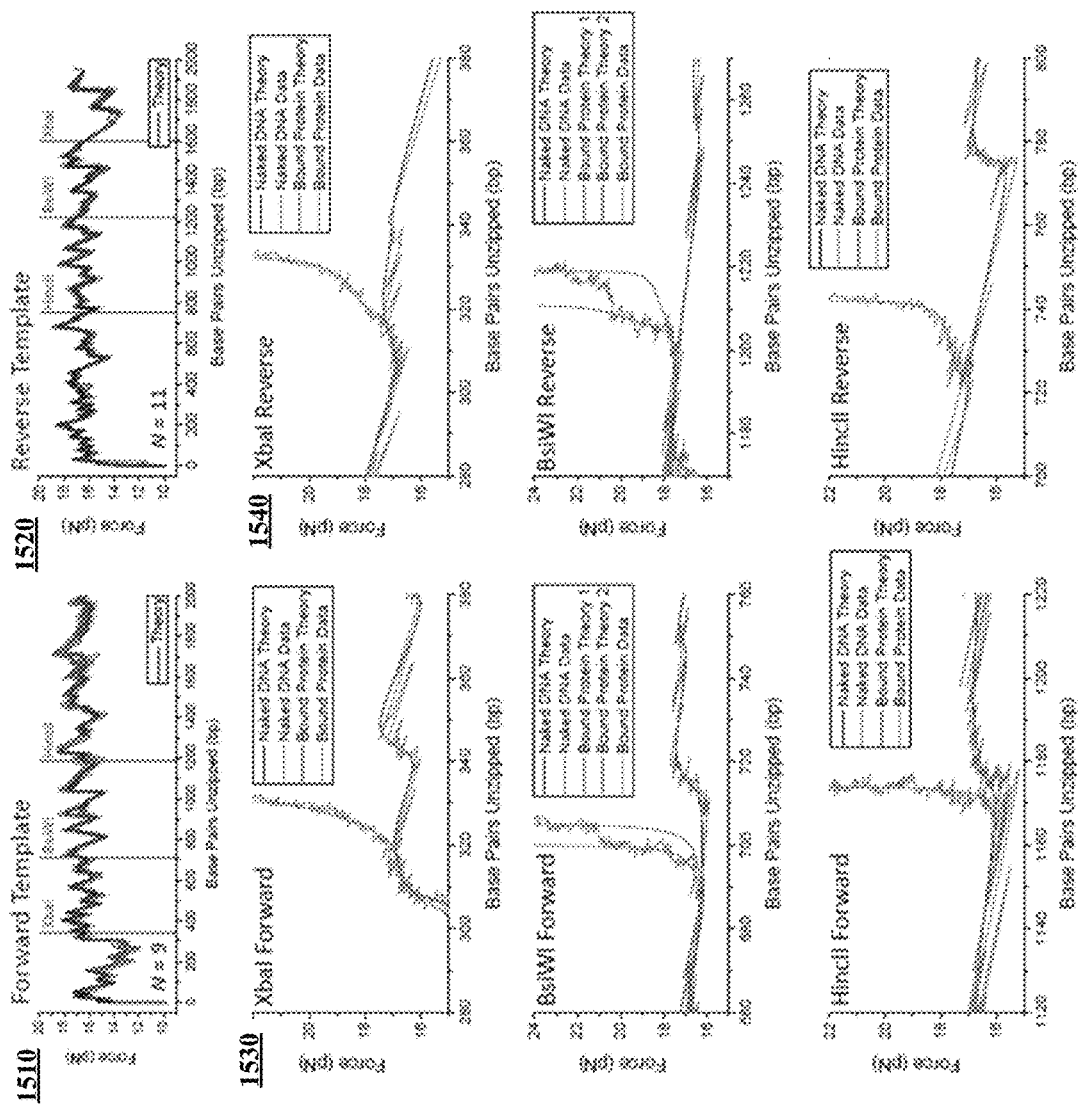
FIG. 15 depicts an example of naked DNA unzipping traces, in accordance with some example embodiments.

FIG. 15 depicts an examples of naked DNA unzipping traces. "Forward" and "reverse" unzipping templates, which overlap for a consensus sequence of ~2000 bp on the same plasmid source but are oriented in opposite directions, were made via PCR. At 1510, 9 naked DNA unzipping traces of the "forward" template are shown. The locations of the three protein binding sites are marked. At 1520, 11 naked DNA unzipping traces of the "reverse" template are shown. Note that due to XbaI's late position in this template, which compromises data quality, an unzipping template was generated on the same plasmid starting 1260 bp into the "reverse" sequence shown, and was used to unzip XbaI from the reverse direction. At 1530, 1540 a single exemplary unzipping trace for both a bound protein and the naked DNA are plotted for each of the three proteins on the forward and reverse templates (XbaI reverse was unzipped on the truncated reverse template).

Figure 16:
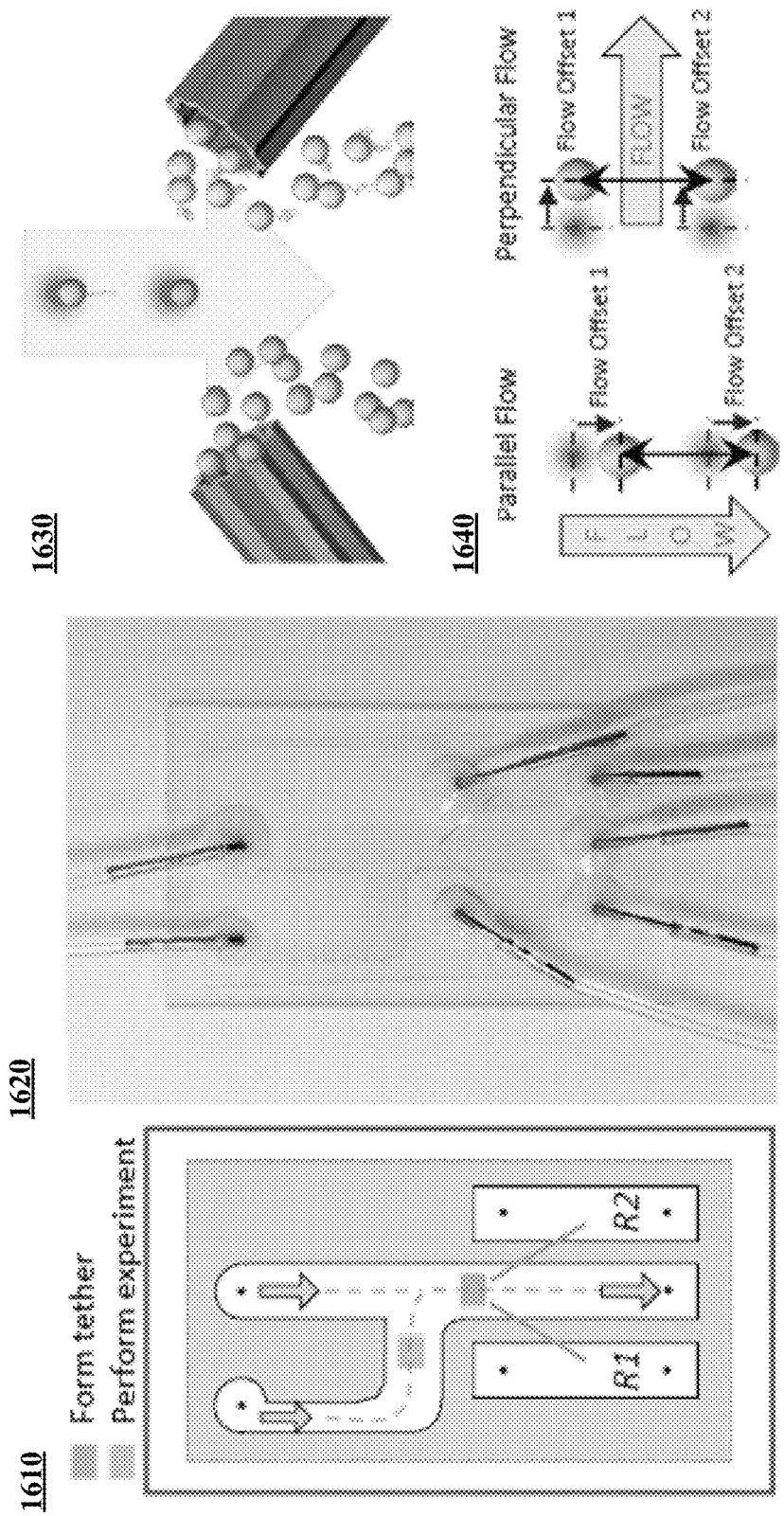
FIG. 16 depicts an example of bi-directional flow cell for single-molecule experiments, in accordance with some example embodiments.

FIG. 16 depicts an example of a bi-directional flow cell for single-molecule experiments. At 1610, is a schematic of a "i-directional flow cell for use in the disclosed system for performing single-molecule experiments. The central channel is where tethers are formed and experiments are performed, and has two inlets joined at a 90° angle leading to a single outlet, with flow as indicated by arrows. Two side reservoirs (R1, R2), are connected to the central channel via small capillaries. The flow cell is operated via gravity feed in order to push reagents for tethering located in the side reservoirs into the central channel. The trapping axis relative to the schematic is vertical. Thus the central channel contains a region of "parallel" flow near the capillary exits, and a region of "perpendicular" flow within the connecting second inlet. At 1620 is an example of a photograph of a flow cell used for performing experiments. The channels and reservoirs are cut and removed from a piece of parafilm, and capillaries are cut and placed onto the parafilm in order to bridge the side reservoirs to the central channel. The parafilm with capillaries in place is sandwiched between a microscope coverslip and a glass slide, and the entire assembly is heated briefly on a hot plate to adhere the components. Holes for fluid input and output are drilled in the glass slide prior to assembly. Tygon tubing is connected to the flow cell holes via short sections of metal tubing which are glued in place. At 1630 is an example of DNA labeled on one end with biotin is attached to streptavidin-coated beads in a pre-incubation step and then flowed into R2. The opposite end of the DNA is labeled with digoxigenin, and beads coated in anti-digoxigenin (aDig) are flowed into R1. Within the central channel at the capillary exits, a downward net flow directs the reagents exiting the capillaries into streams confined by laminar flow. A DNA-coated bead and an aDig-coated bead are sequentially trapped in an order that results in the DNA being flow-extended downwards towards the unbound bead.

The beads can be brought into close proximity and then pulled apart while force is measured. A rise in force as the beads are brought apart indicates the formation of a tether. This can be attempted multiple times if no tether is made initially, however ~90% of bead pairs that will tether do so on the first try. At 1640, is an example showing fluid flow in the central channel can affect the measured separation between two beads. A flow-induced force on the beads creates an offset from the trap center. In the case of flow parallel to the trapping axis, this offset points along the measurement axis of bead separation. Hydrodynamic coupling between the two beads thus makes the measured bead separation dependent on the distance between the traps in a manner that varies with flow rate. In the case of a perpendicular flow, the offset does not affect the measured bead separation. Thus we designed a flow cell with both flow directions, in order to use a parallel flow to extend the DNA and facilitate the formation of tethers, and a perpendicular flow to perform experiments.

Figure 17:
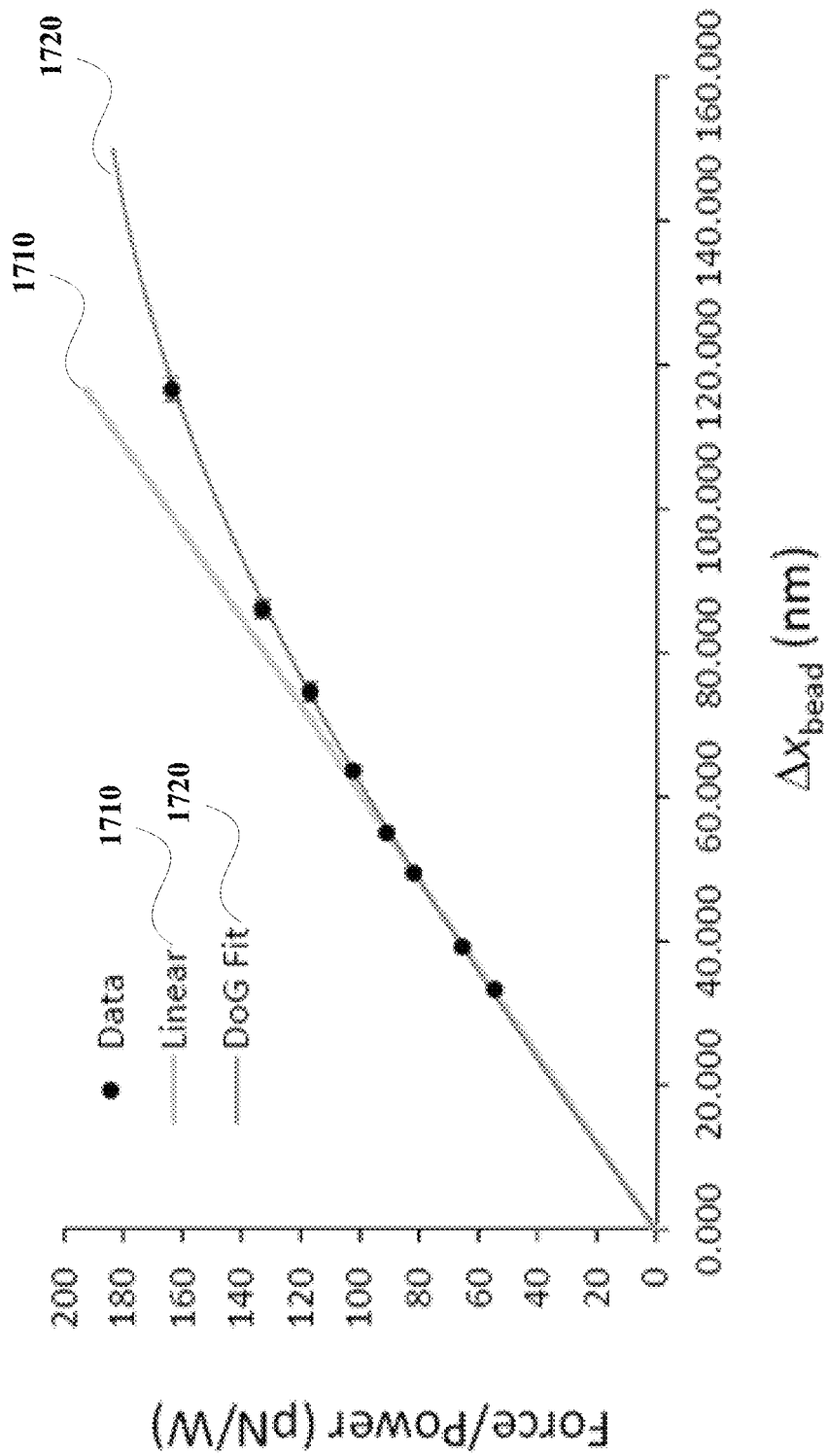
FIG. 17 depicts an example of trap calibration for force conversion, in accordance with some example embodiments.

FIG. 17 depicts an example of trap calibrations for force conversion. FIG. 17 presents trap calibration data from which we extract a trapping stiffness (the number which relates the displacement of the bead in the trap to the exerted force) having a functional dependence on $\Delta_{X_{bead}}$. This leads to more accurate force measurements at high bead displacements as compared to the traditional assumption of constant trapping stiffness across all values of bead displacement (grey, "Linear"). The concept behind the calibration notes that the unzipping force for a DNA sequence may be calculated theoretically, enabling us to measure the bead displacement for a known amount of unzipping force. Accordingly, we unzipped an approximately 1,000 bp template multiple times at various trapping powers. At each power, we determined the average measured bead displacement over a region of the unzipping sequence, as well as the corresponding theoretical unzipping force for the same sequence region. Trap power values corresponded to power in the sample plane. The relationship between Force/Power vs measured $\Delta_{X_{bead}}$ was well-fit by a derivative of Gaussian (DoG) function (blue, "DoG Fit"), and was used to convert a wide range of measured bead displacements into force with high accuracy.

FIG. 18 at Table 1 depicts an example of an illustrative parts list. FIG. 19 at Table 2 depicts examples of DNA sequences of protein binding vicinities.

FIG. 20 depicts an illustration showing force in a dual optical trap. Consider a calibration of trap stiffness using the equipartition theorem, for which we use the differential bead separation to obtain variance. For each trap:

$$½k_x x_1^2 = 1/2k_B T \quad \text{Equations 2}$$

We measure $\Delta x = X2 + x1$, and then use the following relationship to get the calibrated stiffness:

$$½k_{cal}\Delta x^2 = k_B T \quad \text{Equation 3}$$

Because the motion of each bead is uncorrelated, we know that $$\Delta x^2 = \Delta x_1^2 + \Delta x_2^2 \quad \text{Equation 4}$$

Therefore we can find kcal:

$$\frac{1}{2}k_{cal}\left[\frac{k_B T}{k_1} + \frac{k_B T}{k_2}\right] = k_B T \quad \text{Equation 5}$$

$$k_{cal} = \frac{2k_1 k_2}{k_1 + k_2} \equiv k_{eff}$$

Now, during an experiment, the actual force is $$F_{actual} = k_1 x_1 = k_2 x_2 \quad \text{Equation 6}$$

where $$\Delta x_{bend} = \frac{x_2 + x_1}{2} \quad \text{Equation 7}$$

therefore $$F_{measured} = k_{cal}\frac{x_1 + x_2}{2} = \quad \text{Equation 8}$$

$$\frac{2k_1 k_2}{k_1 + k_2}\frac{x_1 + x_2}{2} = \frac{k_2}{k_1 + k_2}F_{actual} + \frac{k_1}{k_1 + k_2}F_{actual} = F_{actual}$$

Therefore, we see that $$F = k_{eff} \cdot \Delta X_{bead} \quad \text{Equation 9}$$

Even for traps of different stiffness and regardless of bead size.

A bound protein modulates upstream DNA unzipping forces. Data obtained by unzipping duplex DNA with and without the HincII restriction enzyme bound at a specific sequence location are shown in the top panel. The sequence unzipped is the "forward" template from FIGS. 5, 6, 13, and 16, however here two adjacent binding sites located much further downstream are examined.

The unzipping data reflects the presence of thermal "breathing" fluctuations of the fork's location within the sequence. In the bottom panel, the theoretical probability density distribution of these fluctuations is shown.

Beginning with naked DNA, the fork's dynamic probability density distribution reflects the underlying DNA sequence. GC-rich regions of the DNA resist strand separation, causing the probability density distribution to narrow and the unzipping force to rise. AT-rich regions of the sequence more easily open under thermal agitation, leading to large scale fork fluctuations between distance unzipping states and a reduced unzipping force.

The naked DNA unzipping process can be compared to the case where a protein is bound at "site 1" on the DNA sequence. Upstream of the bound protein, the fork fluctuations are limited in extent by the GC-rich sequence, and thus the fork does not encounter the protein until the mean fork location is immediately adjacent to the binding site.

The same naked-DNA unzipping process can be compared to the case where a protein is bound at "site 2" on the DNA sequence. This site is located within an AT-rich region that readily separates under thermal agitation ahead of the unzipping fork's mean location. The presence of the tightly bound protein within this region resists strand separation, perturbing the fork's thermal fluctuations and resulting in an elevated unzipping force relative to the naked DNA beginning while the mean fork position is around 50 base pairs upstream of the binding site.

In one aspect, An optical trap device for determining forces, such as biological forces, is disclosed. The device includes a trapping laser light generating two coherent beams; photodiodes to monitor powers from the two coherent beams; a trapping light module located to receive the two coherent beams and to focus the two coherent beams at two optical trap locations to form two optical traps, wherein each optical trap illuminated by one of the two coherent beams is operable to spatially confine a bead; a camera located to capture images of the two optical trap locations; and an image processor coupled to receive the images of the two optical trap locations to track the positions of the two trapped beads over time.

The optical trap device may further include another camera viewing the two beads in the two optical traps illuminated by a first light emitting diode, wherein the other camera aids in tether formation and sample chamber navigation.

In another aspect a method of determining forces, such as biological forces, is disclosed. The method includes, generating, by an optical trap device producing a trapping laser light, two coherent beams; monitoring, by photodiodes, powers from the two coherent beams, wherein a closed loop feedback causes the powers of the two coherent beams to be approximately equal; receiving, at a trapping light module, the two coherent beams and to focusing the two coherent beams at two optical trap locations to form two optical traps, wherein each optical trap illuminated by one of the two coherent beams is operable to spatially confine a bead; capturing, by a camera, images of the two optical trap locations with the two beads in the two optical traps; and processing, by an image processor, the images of the two optical trap locations to track the positions of the two trapped beads over time.

The method may further include viewing, by another camera, the two beads in the two optical traps illuminated by a first light emitting diode, wherein the other camera aids in tether formation and sample chamber navigation.

The following features may be included in various combinations. A force between the two beads is determined by a difference between a free distance between the two beads and a tethered distance between the two beads. The image processor is implemented in a field programmable gate array (FPGA). A displacement from trap center of the two beads is determined to be one half a separation between the two traps minus another separation between the two beads. The optical trap device is included in a microscope. The camera is illuminated by a second light emitting diode. The trapping light has a wavelength of 1064 nanometers (nm), and the second light emitting diode has a wavelength of 445 nm, and the first light emitting diode has a wavelength of 630 nm. The two coherent beams are generated from light from the trapping laser via an acousto-optic deflector (AOD). A closed loop feedback causes the powers of the two coherent beams to be approximately equal.

Advantages of the disclosed subject matter include a modular optical trapping detection platform that can be added to existing commercial microscope setups. Image tracking with nanometer or better precision and accuracy can be performed at speeds up to 10 kHz. Modules include a light source, camera, FPGA based image processor, and executable program code. Other advantages include compatibility with diverse sample substrates and instrument configurations. The disclosed subject matter can be implemented in reflection or transmission mode on a standard microscope enabling a broader array of experimental conditions than standard optical trapping detection. The disclosed subject matter provides improved accuracy in image tracking force measurements by an order of magnitude. The average dual bead displacement from trap center may be measured as one half the dual trap separation minus the dual bead separation. This improves force measurement accuracy by about an order of magnitude. Another advantage is that force measurements retain accuracy and precision in mobile traps. Extending accurate image-based force measurements to mobile traps requires a stable calibration of trap position in the sample plane. Calibrating dual trap separation as disclosed herein instead of individual trap positions for mobile traps improves the accuracy of force measurements by about an order of magnitude. The disclosed FPGA image processing achieves high performance with low latency. A parallelized FPGA architecture of a cross-correlation image tracking algorithm allows for precise and accurate image tracking of micron-sized spherical particles.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. Computer readable media suitable for storing computer program instructions and data include all forms of non-volatile memory, media and non-transitory memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The disclosed embodiments, the functional operations, and modules described in this document can be implemented in analog or digital electronic circuitry, or in computer software, firmware, or hardware, including the structures disclosed in this document and their structural equivalents, or in combinations of one or more of them. The disclosed embodiments can be implemented as one or more computer program products, i.e., one or more modules of computer program instructions encoded on a non-transitory computer readable medium for execution by, or to control the operation of, a data processing apparatus. The computer readable medium can be a machine-readable storage device, a machine-readable storage substrate, a memory device, a composition of matter effecting a machine-readable propagated signal, or a combination of one or more them. The term "computer" encompasses all apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

What is claimed is:

1. An optical trap device for determining forces, comprising:
   a light source generating two coherent beams;
   photodiodes to monitor powers from the two coherent beams;
   a trapping light module located to receive the two coherent beams and to focus the two coherent beams at two optical trap locations to form two optical traps, wherein each optical trap illuminated by one of the two coherent beams is operable to spatially confine a bead;
   a camera located to capture images of the two optical trap locations; and
   an image processor coupled to receive the images of the two optical trap locations to track positions of the two trapped beads over time; an additional camera viewing the two trapped beads in the two optical traps illuminated by a first light emitting diode, wherein the additional camera aids in tether formation and sample chamber navigation.

2. The optical trap device of claim 1, wherein the camera is illuminated by a second light emitting diode.

3. The optical trap device of claim 2, wherein each of the two coherent beams has a wavelength of 1064 nanometers (nm), and the second light emitting diode has a wavelength of 445 nm, and the first light emitting diode has a wavelength of 630 nm.

4. The optical trap device of claim 1, wherein a force between the two trapped beads is determined by a difference between a free distance between the two beads and a tethered distance between the two trapped beads.

5. The optical trap device of claim 1, wherein the image processor is implemented in a field programmable gate array (FPGA).

6. The optical trap device of claim 1, wherein a displacement from a trap center of the two trapped beads is determined to be one half a separation between the two optical traps minus another separation between the two trapped beads.

7. The optical trap device of claim 1, wherein the optical trap device is included in a microscope.

8. The optical trap device of claim 1, the light source includes an acousto-optic deflector that generates the two coherent beams.

9. The optical trap device of claim 1, wherein a closed loop feedback causes the powers of the two coherent beams to be approximately equal.

10. A method of determining biological forces, comprising:
    generating, by an optical trap device, two coherent beams;
    monitoring, by photodiodes, powers from the two coherent beams;
    receiving, at a trapping light module, the two coherent beams and focusing the two coherent beams at two optical trap locations to form two optical traps, wherein each optical trap illuminated by one of the two coherent beams is operable to spatially confine a bead;
    capturing, by a camera, images of the two optical trap locations with the two beads in the two optical traps; and
    processing, by an image processor, the images of the two optical trap locations to track positions of the two trapped beads over time; viewing, by an additional camera, the two trapped beads in the two optical traps illuminated by a first light emitting diode, wherein the additional camera aids in tether formation and sample chamber navigation.

11. The method of claim 10, wherein the camera is illuminated by a second light emitting diode.

12. The method of claim 11, wherein each of the two coherent beams has a wavelength of 1064 nanometers (nm), and the second light emitting diode has a wavelength of 445 nm, and the first light emitting diode has a wavelength of 630 nm.

13. The method of claim 10, wherein a force between the two trapped beads is determined by a difference between a free distance between the two trapped beads and a tethered distance between the two trapped beads.

14. The method of claim 10, wherein the image processor is implemented in a field programmable gate array (FPGA).

15. The method of claim 10, wherein a displacement from a trap center of the two trapped beads is determined to be one half a separation between the two optical traps minus another separation between the two trapped beads.

16. The method of claim 10, wherein the optical trap device is included in a microscope.

17. The method of claim 10, wherein generating includes generating the two coherent beams with an acousto-optic deflector (AOD).

18. The method of claim 10, further comprising causing, with a closed loop feedback, the powers of the two coherent beams to be approximately equal.

* * * * *